US010076185B1

(12) United States Patent
Bennett

(10) Patent No.: US 10,076,185 B1
(45) Date of Patent: Sep. 18, 2018

(54) FURNITURE KITS AND METHODS OF MAKING THE SAME

(71) Applicant: Kolcraft Enterprises, Inc., Chicago, IL (US)

(72) Inventor: Scott Bennett, Chicago, IL (US)

(73) Assignee: Kolcraft Enterprises, Inc., Chicago, IL (US)

( * ) Notice: Subject to any disclaimer, the term of this patent is extended or adjusted under 35 U.S.C. 154(b) by 342 days.

(21) Appl. No.: 15/002,071

(22) Filed: Jan. 20, 2016

Related U.S. Application Data

(60) Provisional application No. 62/106,191, filed on Jan. 21, 2015.

(51) Int. Cl.
*A47B 67/04* (2006.01)
*A47B 47/00* (2006.01)

(52) U.S. Cl.
CPC ...... *A47B 47/0066* (2013.01); *A47B 47/0075* (2013.01); *A47B 47/0091* (2013.01); *A47B 67/04* (2013.01)

(58) Field of Classification Search
CPC ......... Y10T 29/49623; Y10T 29/49826; Y10T 29/49947; Y10T 29/49948
USPC ................. 403/DIG. 12, DIG. 11, DIG. 13
See application file for complete search history.

(56) References Cited

U.S. PATENT DOCUMENTS

| 99,460 | A | * | 2/1870 | Mullane | F16B 21/16 403/317 |
| 1,919,780 | A | * | 7/1933 | Fairbank | E04B 1/6116 249/49 |
| 3,102,308 | A | * | 9/1963 | Parkin | F16B 12/20 217/65 |
| 3,403,641 | A | | 10/1968 | Baker | |
| 3,452,148 | A | | 6/1969 | Schmitt et al. | |
| 3,545,712 | A | | 12/1970 | Ellis | |
| 3,674,327 | A | | 7/1972 | Robinson | |
| 3,675,955 | A | | 7/1972 | Hajduk | |
| 3,862,809 | A | * | 1/1975 | Bodner | F16B 12/20 403/231 |
| 5,419,628 | A | | 5/1995 | Myslinski, Jr. et al. | |
| 5,823,650 | A | | 10/1998 | Lin | |

* cited by examiner

*Primary Examiner* — Jason L Vaughan
*Assistant Examiner* — Amanda Meneghini
(74) *Attorney, Agent, or Firm* — Hanley, Flight & Zimmerman, LLC

(57) ABSTRACT

Example furniture kits and methods of making the same are described. An example method includes coupling a first block of a connector to a rear wall of a disassembled piece of furniture, the first block having a first groove, and coupling a second block of the connector to a side wall of the piece of the furniture, the second block having a second groove. One of the first block or the second block includes an extension and the other of the first block or the second block includes an opening to receive the extension when the first and second blocks are coupled. The example method also includes packaging the rear wall, the side wall and a locking cover into a furniture kit to be used to assemble the piece of furniture. The locking cover is to couple the first and second blocks.

21 Claims, 26 Drawing Sheets

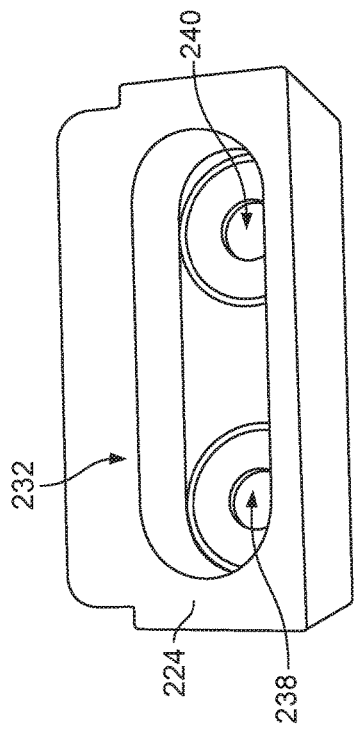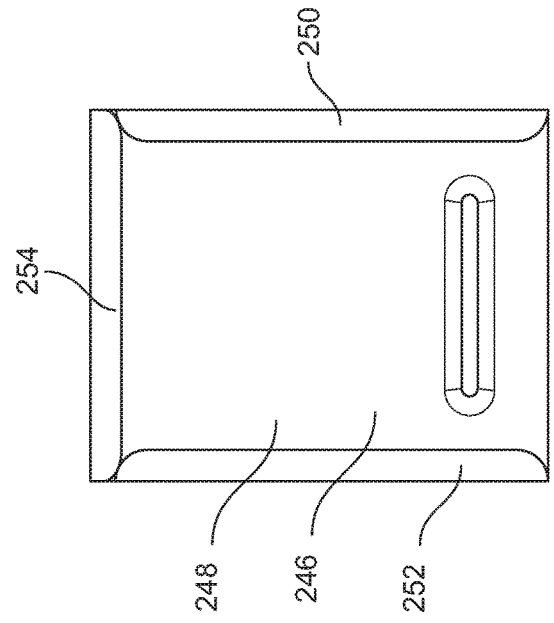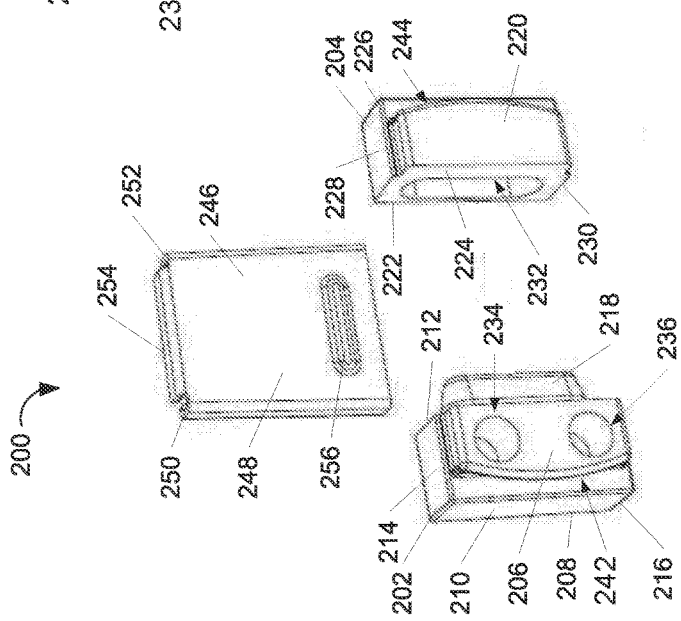

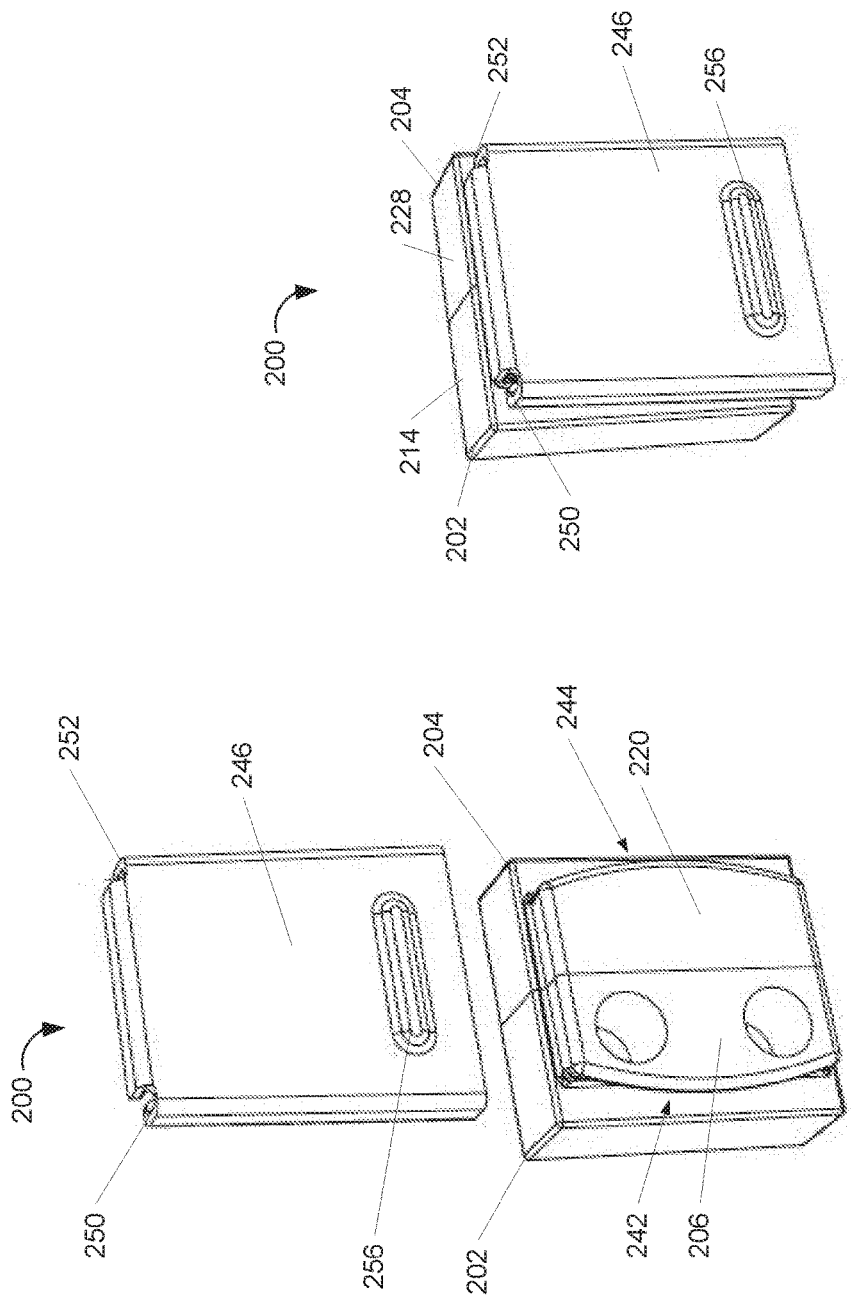

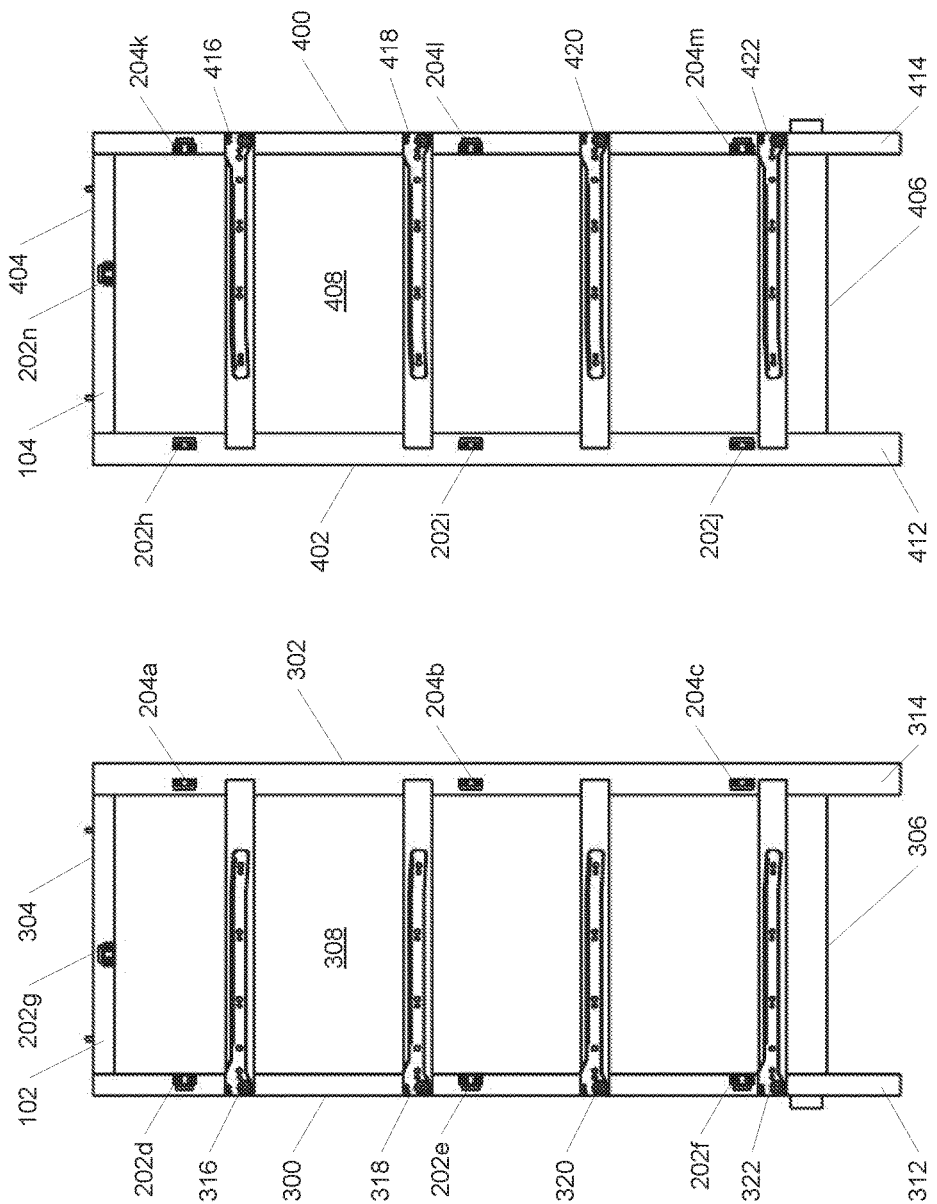

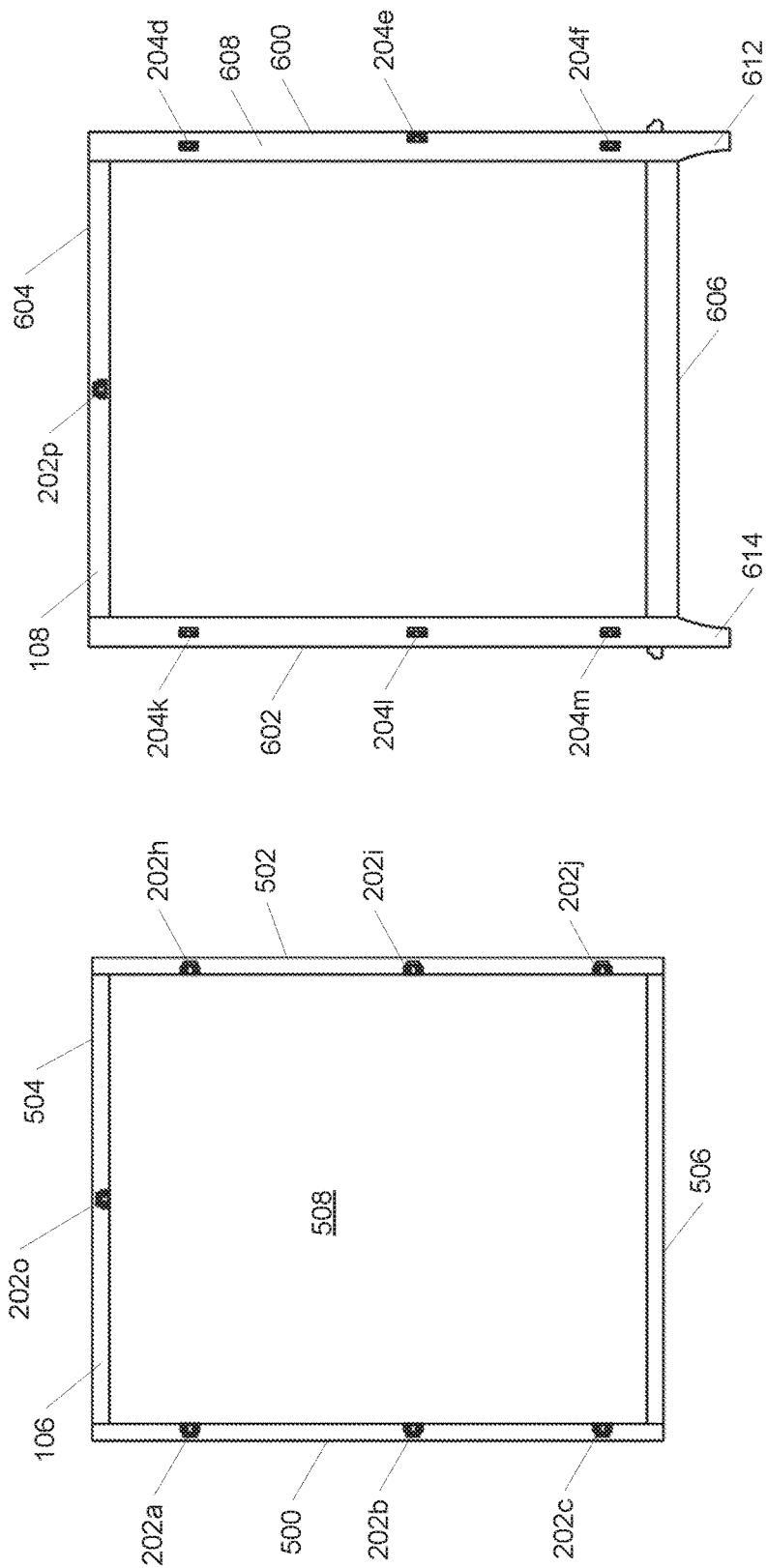

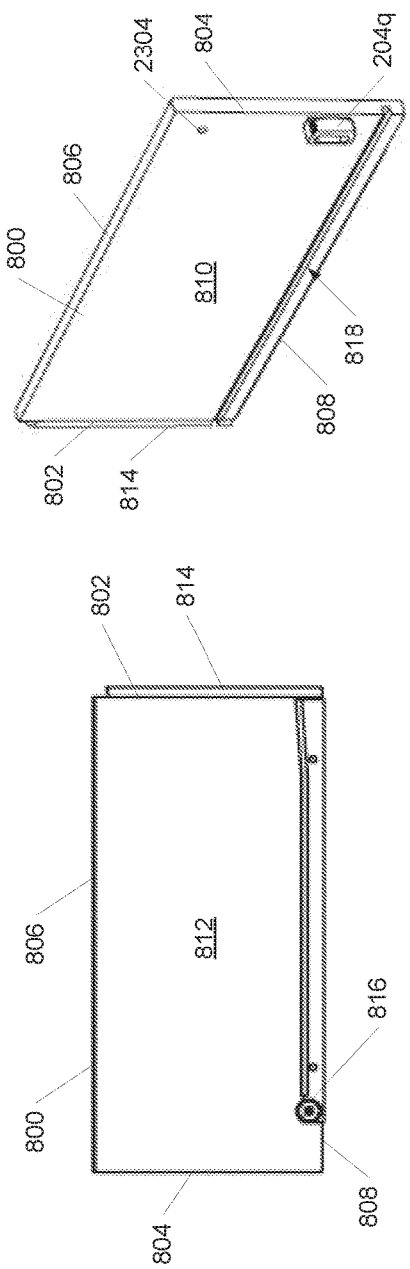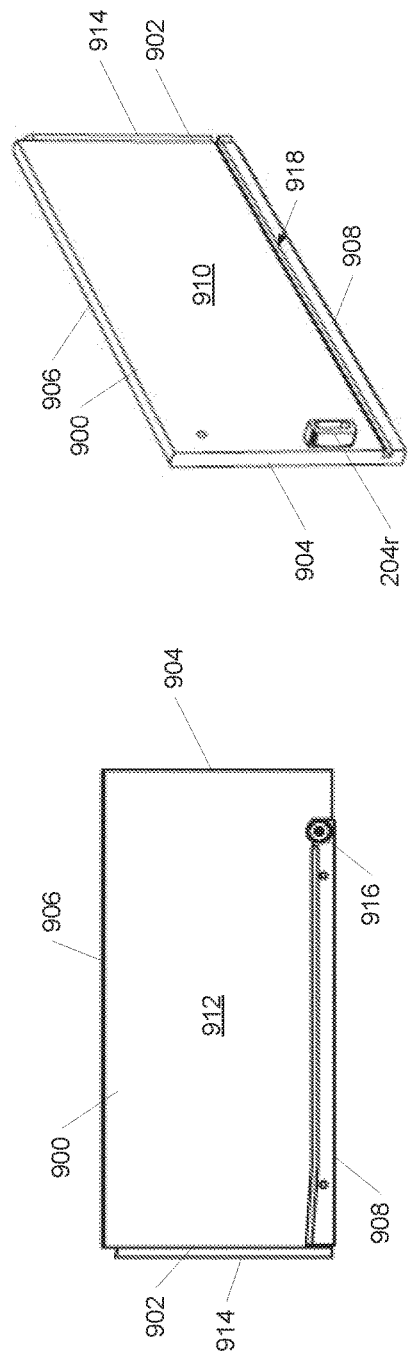

FURNITURE KITS AND METHODS OF MAKING THE SAME

RELATED APPLICATION

This application claims the benefit under 35 U.S.C. § 119(e) to U.S. Provisional Application No. 62/106,191, titled "FURNITURE KITS AND METHODS OF MAKING THE SAME," filed Jan. 21, 2015, which is incorporated herein by this reference in its entirety.

FIELD OF THE DISCLOSURE

This disclosure relates generally to furniture and, more particularly, to ready-to-assemble furniture kits and methods of making the same.

BACKGROUND

Ready-to-assemble (RTA) furniture, also known as knock-down furniture or flat pack furniture, is a type of furniture that requires assembly before use. Typically, RTA furniture is assembled by the customer. RTA furniture is generally packaged in a kit having one or more boxes that include the parts of the furniture as well as any hardware needed to assemble the parts to build the furniture. RTA furniture kits are ideal for shipping or transporting and are generally less expensive than fully assembled furniture. RTA furniture kits usually include simple tools to assemble the parts.

BRIEF DESCRIPTION OF THE DRAWINGS

FIG. 2A is an exploded view of an example connector having an example male connector block, an example female connector block and an example clip. Multiple ones of the example connector are implemented to couple the parts of the example RTA furniture kit to build the example dresser of FIG. 1.

FIG. 2B is a perspective view of the example female block of FIG. 2A having an example opening.

FIG. 2C is a perspective view of the example clip of FIG. 2C having example curved lips.

FIG. 2D is a perspective view of the example male block of FIG. 2A engaged with the example female block of FIG. 2A and the example clip of FIG. 2A unassembled from the example male and female blocks.

FIG. 2E is a perspective view of the example clip of FIG. 2A coupling the example male and female blocks of FIG. 2D.

FIG. 3 is a side view of an example left side wall of the example RTA furniture kit of FIG. 1 that may be used to build the example dresser.

FIG. 4 is a side view of an example right side wall of the example RTA furniture kit of FIG. 1 that may be used to build the example dresser.

FIG. 5 is a side view of an example rear wall of the example RTA furniture kit of FIG. 1 that may be used to build the example dresser.

FIG. 6 is a side view of an example front wall of the example RTA furniture kit of FIG. 1 that may be used to build the example dresser.

FIG. 8A is a side view of an example left side drawer wall of the example RTA furniture kit of FIG. 1 that may be used to build one of the example drawers.

FIG. 8B is a perspective view of the example left side drawer wall of FIG. 8A.

FIG. 9A is a side view of an example right side drawer wall of the example RTA furniture kit of FIG. 1 that may be used to build one of the example drawers.

FIG. 9B is a perspective view of the example right side drawer wall of FIG. 9A.

Figure 1:
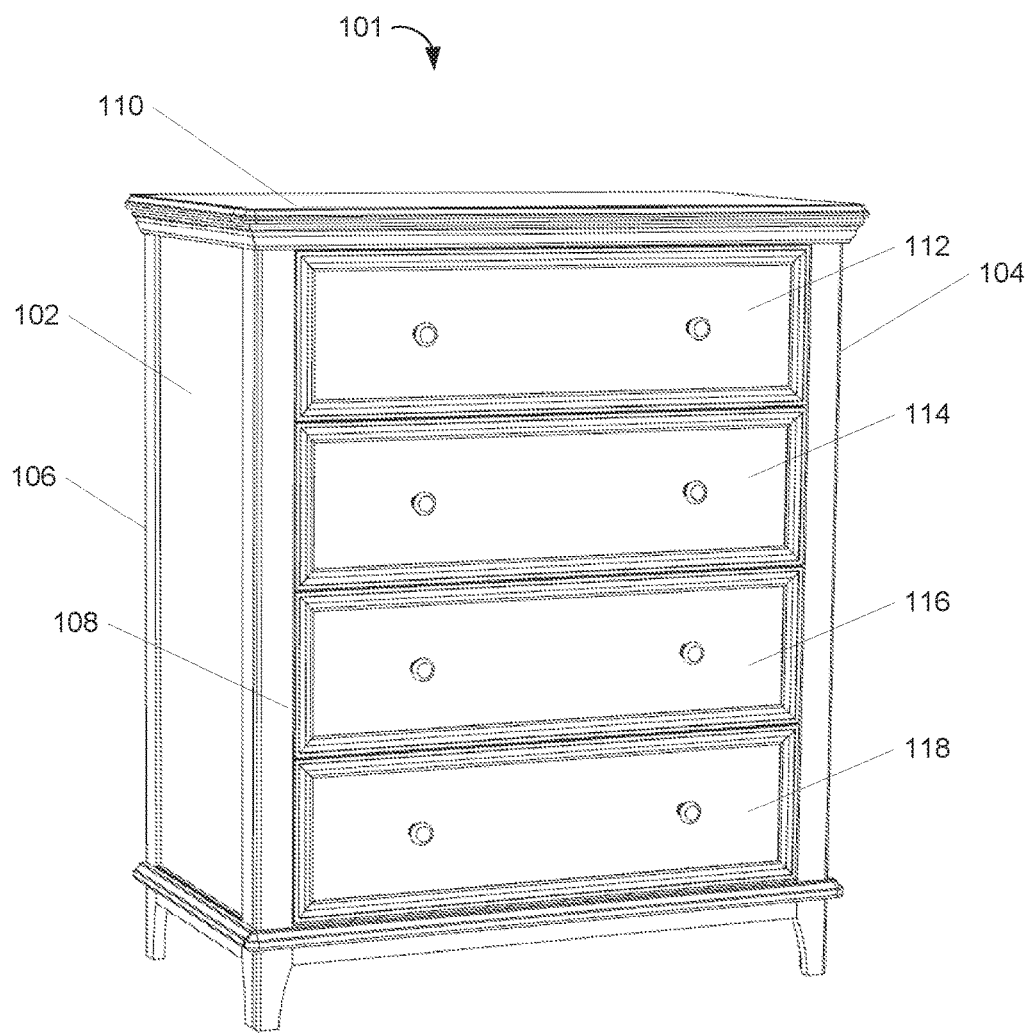
FIG. 1 is a perspective view of an example dresser with a plurality of drawers that has been assembled via an RTA furniture kit in accordance with the teachings of this disclosure.

Certain examples are shown in the above-identified figures and described in detail below. In describing these examples, like or identical reference numbers are used to identify the same or similar elements. The figures are not to scale. Instead, the thickness of the layers may be enlarged in the drawings. Additionally, several examples have been described throughout this specification. Any features from any example may be included with, a replacement for, or otherwise combined with other features from other examples.

DETAILED DESCRIPTION

Ready-to-assemble (RTA) furniture, also known as knock-down furniture or flat pack furniture, is generally packaged in a kit having of one or more cartons or boxes that include the parts of the furniture, hardware needed to assemble the parts and tools need to interact with the hardware. RTA furniture kits also commonly include assembly instructions or manuals. The hardware includes fasteners or fixings that are used to connect the parts of the furniture. Some known RTA furniture kits include specialized tools to interact with the hardware. Although known RTA furniture kits are intended to be easily assembled, dealing with the fasteners and assembling the parts is typically a frustrating and time consuming process. For example, some known RTA furniture kits include a plurality of elongated screws or bolts that are used to join the parts of the furniture together. To assemble the furniture, a customer is expected to align the screw holes in the parts, insert the screws and manually turn the screws to join the two or more parts together. However, this process of aligning the correct screw holes and manually turning the screws to join the respective parts is time consuming and cumbersome.

Disclosed herein are example ready-to-assemble (RTA) furniture kits containing a plurality of parts or components having connector blocks that couple together and enable relatively easy assembly. Any type of furniture may be assembled with the disclosed kits (e.g., a dresser, a bookshelf, a crib, a bed, a table, a chair, a couch, etc.). For instance, example RTA furniture kits disclosed herein include a plurality of parts or components that may be assembled to build a dresser having a plurality of drawers. The parts or components include a plurality of walls or panels that define the dresser and the drawers. The walls of the dresser and/or the drawers are coupled or joined using one or more connectors. The example connectors include a male connector block that is coupled to one of the walls and a female connector block that is coupled to another one of the walls. When the two walls are to be joined (e.g., during assembly), the male and female blocks are engaged, and a clip or locking cover is inserted into the engaged male and female blocks to couple the blocks and, thus, couple the walls. The walls of the example RTA furniture kits may be assembled into dressers in a matter of minutes. Further, the RTA furniture kit does not require any specialized tools or equipment to assemble.

Example methods disclosed herein include coupling a first block of a first connector to a rear wall of a disassembled piece of furniture. The rear wall has a first side edge and a second side edge opposite the first side edge. The first block is to be coupled at or near the first side edge. The first block has a first groove. Example methods include coupling a second block of the first connector to a first side wall of the piece of furniture. The first side wall has a front side edge and a rear side edge. The second block is to be coupled at or near the rear side edge. The second block has a second groove. The first side edge of the rear wall is to be engaged with the first side wall at or near the rear side edge of the first side wall when the piece of furniture is assembled. One of the first block or the second block includes a first extension and the other of the first block or the second block includes a first opening to receive the first extension when the first and second blocks are coupled. When the first and second blocks are coupled, the first groove and the second groove are disposed on opposite sides of the first connector. Some such example methods also include packaging the rear wall, the first side wall and a first locking cover into a furniture kit to be used to assemble the piece of furniture (e.g., a dresser). The first locking cover includes a first plate with a first tongue along a first edge of the first plate and a second tongue along a second edge of the first plate opposite the first edge of the first plate. To couple the first and second blocks, the first locking cover is to be slid over the first connector to insert the first tongue into the first groove and insert the second tongue into the second groove.

In some examples, when the first and second blocks are coupled and the rear wall and the first side wall are assembled, the first and second grooves are oriented vertically. In some such examples, the first locking cover is to be slid in a vertical direction to insert the first and second tongues into the respective first and second grooves. In some examples, when the first locking cover is coupled to the first and second blocks, the plate is orientated parallel to the rear wall.

In some example methods, a third block of a second connector is coupled to the first side wall at or near the front side edge of the first side wall. The third block has a third groove. In such examples, the methods also include coupling a fourth block of the second connector to a front trim plate of the piece of furniture. The front trim plate has a first side edge and a second side edge opposite the first side edge. The fourth block is to be coupled at or near the first side edge of the front trim plate. The fourth block has a fourth groove. The first side edge of the front trim plate is to be engaged with the front side edge of the first side wall when the piece of furniture is assembled. One of the third block or the fourth block includes a second extension and the other of the third block or the fourth block includes a second opening to receive the second extension when the furniture is assembled. When the third and fourth blocks are coupled to form the second connector, the third groove and the fourth grooves are disposed on opposite sides of the second connector. In some examples, packaging the furniture kit further includes packaging the front trim plate and a second locking cover. The second locking cover includes a second plate with a third tongue along a third edge of the second plate and a fourth tongue along a fourth edge of the second plate opposite the third edge of the second plate. To couple the third and fourth second blocks, the second locking cover is to be slid over the second connector to insert the third tongue into the third groove and insert the fourth tongue into the fourth groove. In some such examples, when the first and second blocks are coupled and the rear wall and the first side wall are assembled, the first and second grooves are oriented vertically, and, when the third and fourth blocks are coupled and the first side wall and the front trim plate are assembled, the third and fourth grooves are oriented vertically. In some examples, when the first locking cover is coupled to the first connector and the second locking cover is coupled to the second connector, the first and second locking covers are oriented perpendicular to each other. In some examples, when the first locking cover is coupled to the first connector and the second locking cover is coupled to the second connector, the first locking cover is parallel to the rear wall and the front trim plate and the second locking cover is parallel to the side wall.

Some example methods include coupling a third block of a second connector to a rear drawer wall of an unassembled drawer. The rear drawer wall has a first side edge and a second side edge opposite the first side edge. The third block is to be coupled at or near the first side edge of the rear drawer wall. The third block has a third groove. Some such examples methods also include coupling a fourth block of the second connector to a first side drawer wall of the drawer. The first side drawer wall has a rear side edge and a front side edge. The fourth block is to be coupled at or near the rear side edge of the first side drawer wall. The fourth block has a fourth groove. The rear side edge of the first side drawer wall is to be engaged with the first side edge of the rear drawer wall when the drawer is assembled. One of the third block or the fourth block includes a second extension and the other of the third block or the fourth block includes a second opening to receive the second extension when the first drawer is assembled. When the third and fourth blocks are coupled to form the second connector, the third groove and the fourth groove are disposed on opposite sides of the second connector. In some examples, the third block includes the second extension and the fourth block includes the second opening. In some such examples, the second extension extends from the third block in a direction that is parallel to the rear drawer wall. In some examples, the third block is to be coupled to an outer surface of the rear drawer wall, such that when the first drawer is assembled, the second connector is disposed outside of a cavity provided by the first drawer. In some examples, packaging the furniture kit further includes packaging the rear drawer wall, the first side drawer wall and a second locking cover. The second locking cover includes a second plate with a third tongue along a third edge of the second plate and a fourth tongue along a fourth edge of the second plate opposite the third edge of the second plate. To couple the third and fourth second blocks, the second locking cover is to be slid over the second connector to insert the third tongue into the third groove and insert the fourth tongue into the fourth groove. In some examples, when the second locking cover is coupled to the second connector, the second plate is parallel to the rear drawer wall. In some such examples, when the piece of furniture is assembled and the first and second blocks are coupled with the first locking cover, and when the drawer is assembled and the third and fourth blocks are coupled with the second lock cover, the first plate and the second plate are parallel to each other.

In some example methods, a rail is coupled to an inside surface of the first side wall and coupling a roller to an outside surface of the first drawer wall. The rail is to receive the roller when the piece of furniture is assembled and the drawer is assembled. In some examples, when the piece of furniture is assembled and the drawer is assembled, the roller of the drawer is to be moveable along a first axis of the rail. In some examples, the first locking cover is to slide along a second axis to couple the first and second blocks, the second axis orthogonal to the first axis.

In some examples, packaging the furniture kit includes packaging a second side wall of the piece of furniture. The second side wall has a front side edge and a rear side edge. The second side edge of the rear wall is to be engaged with the second side wall at or near the rear side edge of the second side wall when the piece of furniture is assembled. In some examples, the piece of furniture is a dresser.

Example furniture kits disclosed herein include a rear wall of a piece of furniture (e.g., dresser). The rear wall has a first side edge and a second side edge opposite the first side edge. The example furniture kits also include a first side wall. The first side wall has a front side edge and a rear side edge. The first side edge of the rear wall is to be engaged with the first side wall at or near the rear side edge of the first side wall when the piece of furniture is assembled. The example furniture kits include a first block of a first connector. The first block is coupled to the rear wall at or near the first side edge, and the first block has a first groove. The example furniture kits also include a second block of the first connector. The second block is coupled to the first side wall at or near the rear side edge, and the second block having a second groove. One of the first block or the second block includes a first extension and the other of the first block or the second block includes a first opening to receive the first extension when the first and second blocks are coupled. The example furniture kits further include a first locking cover having a first plate with a first tongue along a first edge of the first plate and a second tongue along a second edge of the first plate opposite the first edge of the first plate. The first locking cover is to be slid over the first connector to insert the first tongue into the first groove and insert the second tongue into the second groove to couple the first and second blocks.

In some examples, when the first and second blocks are coupled and the rear wall and the first side wall are assembled, the first and second grooves are oriented vertically. In some such examples, the first locking cover is to be slid in a vertical direction to insert the first and second tongues into the respective first and second grooves. In some examples, when the first locking cover is coupled to the first and second blocks, the first plate is orientated parallel to the rear wall.

Some example furniture kits include a front trim plate. The front trim plate has a first side edge and a second side edge opposite the first side edge. The front side edge of the first side wall is to be engaged with the front trim plate at or near the first side edge of the front trim plate when the piece of furniture is assembled. In such examples, the furniture kits also include a third block of a second connector. The third block is coupled to the first side wall at or near the front side edge of the first side wall, and the third block having a third groove. In such examples, the furniture kits also include a fourth block of the second connector. The fourth block is coupled to the front trim plate at or near the first side edge of the front trim plate. The fourth block has a fourth groove. One of the third block or the fourth block includes a second extension and the other of the third block or the fourth block includes a second opening to receive the second extension when the dresser is assembled. In such examples, the furniture kits further include a second locking cover having a second plate with a third tongue along a third edge of the second plate and a fourth tongue along a fourth edge of the second plate opposite the third edge. The second locking cover is to be slid over the second connector to insert the third tongue into the third groove and insert the fourth tongue into the fourth groove to couple the third and fourth blocks. In some examples, when the first and second blocks are coupled and the rear wall and the first side wall are assembled, the first and second grooves are oriented vertically, and, when the third and fourth blocks are coupled and the first side wall and the front trim plate are assembled, the third and fourth grooves are oriented vertically. In some such examples, when the first locking cover is coupled to the first connector and the second locking cover is coupled to the second connector, the first and second locking covers are oriented perpendicular to each other. In some examples, when the first locking cover is coupled to the first connector and the second locking cover is coupled to the second connector, the first locking cover is parallel to the rear wall and the front trim plate and the second locking cover is parallel to the side wall.

Some example furniture kits further include a rear drawer wall of an unassembled drawer. The rear drawer wall has a first side edge and a second side edge opposite the first side edge. In such examples, the furniture kits also include a first side drawer wall of the drawer. The first side drawer wall has a rear side edge and a front side edge, and the first side edge of the rear drawer wall is to be engaged with the first side drawer wall at or near the rear side edge of the first side drawer wall when the drawer is assembled. In such examples, the furniture kits include a third block of a second connector, and the third block is coupled to the rear drawer wall at or near the first side edge of the rear drawer wall, and the third block having a third groove. In such examples, the furniture kits includes a fourth block of the second connector, and the fourth block is coupled at or near the rear side edge of the first side drawer wall, and the fourth block has a fourth groove. One of the third block or the fourth block includes a second extension and the other of the third block or the fourth block includes a second opening to receive the second extension when the first drawer is assembled. In such examples, the furniture kits further include a second locking cover having a second plate with a third tongue along a third edge of the second plate and a fourth tongue along a fourth edge of the second plate opposite the third edge. The second locking cover is to be slid over the second connector to insert the third tongue into the third groove and insert the fourth tongue into the fourth groove to couple the third and fourth blocks.

In some examples, the third block includes the second extension and the fourth block includes the second opening. In some examples, the second extension extends from the third block in a direction that is parallel to the rear drawer wall. In some examples, the third block is coupled to an outer surface of the rear drawer wall, such that when the drawer is assembled, the second connector is disposed outside of a cavity provided by the drawer. In some examples, when the second locking cover is coupled to the third and fourth blocks, the second plate is parallel to the rear drawer wall. In some such examples, when the furniture is assembled and the first and second blocks are coupled with the first locking cover, and when the drawer is assembled and the third and fourth blocks are coupled with the second locking cover, the first plate and the second plate are parallel to each other.

In some examples, the furniture kits include a second side wall of the piece of furniture. The second side wall has a front side edge and a rear side edge, and the second side edge of the rear wall is to be engaged with the second side wall at or near the rear side edge of the second side wall when the piece of furniture is assembled. In some examples, the piece of furniture is a dresser.

Example methods disclosed herein include coupling a first block of a connector to a rear wall of an unassembled drawer. The rear wall has a first side edge and a second side edge opposite the first side edge, the first block is to be coupled at or near the first side edge, and the first block has a first groove. The example methods include coupling a second block of the connector to a first side wall of the drawer. The first side wall has a front side edge and a rear side edge, the second block is to be coupled at or near the rear side edge, and the second block has a second groove. The first side edge of the rear wall is to be engaged with the first side wall at or near the rear side edge of the first side wall when the drawer is assembled. One of the first block or the second block includes an extension and the other of the first block or the second block includes an opening to receive the extension when the first and second blocks are coupled. When the first and second blocks are coupled, the first groove and the second groove are disposed on opposite sides of the connector. The example methods also include packaging the rear wall, the first side wall and a locking cover into a drawer kit. The locking cover includes a plate with a first tongue along a first edge of the plate and a second tongue along a second edge of the plate opposite the first edge of the plate. To couple the first and second blocks, the locking cover is to be slid over the first and second blocks to insert the first tongue into the first groove and insert the second tongue into the second groove.

In some examples, the first groove is parallel to the first side edge of the rear wall and the second groove is parallel to the rear side edge of the first side wall. In some examples, to couple the first and second blocks, the locking cover is slid in a direction that is parallel to the rear side edge of the first side wall. In some such examples, the plate of the locking cover, when coupled to the first and second blocks, is orientated parallel to the rear wall.

In some examples, the first block is to be coupled to an outer surface of the rear wall, such that when the drawer is assembled, the connector is disposed outside of a cavity formed by the drawer. In some examples, the first block includes the extension and the second block includes the opening. In some such examples, when the first block is coupled to the rear wall, the extension extends from the first block in a direction that is parallel to the rear wall.

Example furniture kits disclosed herein include a rear wall of an unassembled drawer. The rear wall has a first side edge and a second side edge opposite the first side edge. The example furniture kits include a first side wall of the drawer. The first side wall has a front side edge and a rear side edge opposite the front side edge, and the first side edge of the rear wall is to be engaged with the first side wall at or near the rear side edge of the first side wall when the drawer is assembled. The example furniture kits also include a first block of a connector. The first block is coupled to the rear wall at or near the first side edge, and the first block having a first groove. The example furniture kits include a second block of the connector. The second block is coupled to the first side wall at or near the rear side edge, and the second block has a second groove. One of the first block or the second block includes an extension and the other of the first block or the second block includes a opening to receive the first extension when the first and second blocks are coupled. The example furniture kits further include a locking cover having a plate with a first tongue along a first edge of the plate and a second tongue along a second edge of the plate opposite the first edge of the plate. The locking cover is to be slid over the first and second blocks to insert the first tongue into the first groove and insert the second tongue into the second groove to couple the first and second blocks.

In some examples, the first groove is parallel to the first side edge of the rear wall and the second groove is parallel to the rear side edge of the first side wall. In some examples, to couple the first and second blocks, the locking cover is slid in a direction that is parallel to the rear side edge of the first side wall. In some such examples, the locking cover, when coupled to the first and second blocks, is orientated parallel to the rear wall. In some examples, the rear wall has an outer surface and an inner surface opposite the outer surface. The first block is coupled to the outer surface, such that when the drawer is assembled, the connector is disposed outside of a cavity formed by the drawer.

In some examples, the first block includes the extension and the second block includes the opening. In some such examples, the extension extends from the first block in a direction that is parallel to the rear wall.

Example furniture kits disclosed herein include a first panel having a first face of the first panel, a second face of the first panel, a first connector coupled to the first face of the first panel and a second connector coupled to the first face of the first panel. Example furniture kits also include a second panel that is to be coupled to the first panel. The second panel includes a first face of the second panel, a second face of the second panel, a first complementary connector coupled to the first face of the second panel and to be coupled to the first connector, a second complementary connector coupled to the first face of the second panel and to be coupled to the second connector and a first rail coupled to the first face of the second panel. Example furniture kits include a third panel to be coupled to the first panel opposite the second panel and a drawer to be moveably coupled across the second panel and the third panel. The drawer is movable in a first direction in the first rail. Example furniture kits further include a first connector cover to be positioned over the first connector and the first complementary connector. The first connector cover is slidable in a second direction, which is orthogonal to the first direction.

In some examples, the furniture kits include a second connector cover that is to be positioned over the second connector and the second complementary connector. The second connector cover is slidable in the second direction.

In some examples, the first panel of the example kit further includes a third connector coupled to the first face of the first panel and a fourth connector coupled to the first face of the first panel, and the third panel of the example kit further includes a first face of the third panel, a second face of the third panel, a third complementary connector coupled to the first face of the third panel and to be coupled to the third connector, a fourth complementary connector coupled to the first face of the third panel and to be coupled to the fourth connector and a second rail coupled to the first face of the third panel. In such an example, the drawer is movable in the first direction in the second rail and the kit also includes a third connector cover to be positioned over the third connector and the third complementary connector. The third connector cover is slidable in the second direction. In some such examples, the kit includes a fourth connector cover to be positioned over the fourth connector and the fourth complementary connector. The fourth connector cover is slidable in the second direction.

In some examples, the furniture kits include a first drawer panel having a first face of the first drawer panel, a second face of the first drawer panel and a third connector coupled to the second face of the first drawer panel. In such examples, the furniture kits also include a second drawer panel to be coupled to the first drawer panel. The second drawer panel has a first face of the second drawer panel, a second face of the second drawer panel, a third complementary connector coupled to the second face of the second drawer panel and to be coupled to the third connector and a first roller coupled to the first face of the second drawer panel, the roller movable in the first rail. In such examples, the kits include a third drawer panel to be coupled to the first drawer panel opposite the second drawer panel a third connector cover to be positioned over the third connector and the third complementary connector. The third connector cover is slidable in the second direction. In some examples, the third panel includes a second rail coupled to the first face of the third panel, the first drawer panel includes a fourth connector coupled to the second face of the first drawer panel and the third drawer panel includes a fourth complementary connector coupled to the second face of the third drawer panel and to be coupled to the fourth connector and a second roller coupled to the first face of the third drawer panel, the roller movable in the second rail. In such examples, the furniture kits also include a fourth connector cover to be positioned over the fourth connector and the fourth complementary connector. The fourth connector cover is slidable in the second direction. In some examples, a first cavity is defined by the first panel, the second panel, and the third panel, a second cavity is defined by the first drawer panel, the second drawer panel, and the third drawer panel, and the first connector, first complementary connector, the second connector, the second complementary connector, the third connector, the third complementary connector, the fourth connector, and the fourth complementary connector are to be disposed in the first cavity and outside of the second cavity.

An example RTA furniture kit includes all of the components of FIGS. 1-26 in an unassembled state or a partially unassembled state where one or more of the component(s) are coupled to one or more other component(s). The example RTA furniture kit may include one or more boxes to contain the parts or components. In this example, the RTA furniture kit includes a plurality of parts or components to build a dresser having a plurality of drawers. However, the examples disclosed here also may be included in other kits to build other types of furniture. An example assembled dresser 101 is illustrated in FIG. 1. The example dresser 101 includes a left side wall 102, a right side wall 104, a rear wall 106, a front wall 108 and a top wall 110. The example dresser 101 also includes a plurality of drawers. In the illustrated example, the dresser 101 includes a first drawer 112, a second drawer 114, a third drawer 116 and a fourth drawer 118. The parts or components of the kit are discussed in further detail herein.

To couple the respective walls of the dresser 101 and/or the walls of the drawers 112-118, the example kit includes a plurality of connectors. In general, the connectors may be implemented to couple the respective walls at a right angle. An example one of the connectors 200 is illustrated in FIGS. 2A-2E. FIG. 2A illustrates an exploded view of the connector 200. The connector 200 includes a first or male connector block 202 (e.g., a first portion, first section) and a second or female connector block 204 (e.g., a second portion, a second section). The male block 202 is to be coupled to first member (e.g., a wall), and the female block 204 is to be coupled to a second member that is to be joined to the first member. The male block 202 is substantially rectangular shaped. In the illustrated example, the male block 202 has a first side 206 (e.g., a front side), a second side 208 (e.g., a rear side) opposite the first side 206, a third side 210, a fourth side 212 opposite the third side 210, a fifth side 214 and a sixth side 216 opposite the fifth side 214. The male block 202 has an extension 218 extending from the fourth side 212.

In the illustrated example, the female block 204 is also substantially rectangular shaped. The female block 204 has a first side 220 (e.g., a front side), a second side 222 (e.g., a rear side) opposite the first side 220, a third side 224, a fourth side 226 opposite the third side 224, a fifth side 228 and a sixth side 230 opposite the fifth side 228. The female block 204 has an opening 232 on the third side 224 to receive the extension 218 when the male and female blocks 202, 204 are engaged. The opening 232 is shaped to receive the extension 218.

The male block 202 has two holes 234, 236 (e.g., apertures, openings, channels) extending from the first side 206 to the second side 208. The two holes 234, 236 may be used to receive screws or other fastening devices to couple the male block 202 to a first component (e.g., a first one of the side walls). In the illustrated example, the two holes 234, 236 are countersunk to enable a head of a screw to be inserted beneath the surface of the first side 206. As illustrated in FIG. 2B, the female block 204 also has two holes 238, 240. The holes 238, 240 are disposed within the opening 232 and extend through the fourth side 226. The holes 238, 240 are to receive screws or other fastening devices to couple the female block 204 to a second component (e.g., a second one of the side walls). In some examples the male block 202 is coupled to the first component and/or the female block 204 is coupled to the second component prior to inclusion of the blocks 202, 204 and components in the kit.

In the illustrated example of FIGS. 2A-E, the male block 202 has a first groove or slot 242 (e.g., a channel) extending into the third side 210 along the first side 206. The female block 204 has a second groove or slot 244 extending into the fourth side 226 along the first side 220.

To couple or secure the male and female blocks 202, 204, the connector 200 includes a clip or locking cover 246. The backside of the locking cover 246 is illustrated in FIG. 2C. As illustrated in FIGS. 2B and 2C, the locking cover 246 is c- or u-shaped and includes a plate 248 with a first curved lip 250 (e.g., a first tongue) and a second curved lip 252 (e.g., a second tongue). The first and second curved lips 250, 252 are on opposite edges of the plate 248 and curve or fold over toward the center. The plate 248 also has a top edge 254 that also is curved toward the center. The locking cover 246 includes a ridge or protrusion 256 to be used as a support for a user's finger.

FIG. 2D illustrates the male and female blocks 202, 204 of the connector 200 when engaged. The extension 218 (FIG. 2A) is inserted into the opening 232 (FIG. 2A). When the male and female blocks 202, 204, the first groove 242 and the second groove 244 are facing opposite directions. To further couple the male and female blocks 202, 204, the locking cover 246 may be slid over the first sides 206, 220 of the engaged male and female blocks 202, 204. As the locking cover 246 is slid over the first sides 206, 220, the first curved lip 250 is inserted into the first groove 242 of the male block 202 and the second curved lip 252 is inserted into the second groove 244 of the female block 204. To perform this action, a user may place his/her thumb on the ridge 256 and force the locking cover 246 along the front side 206, 220 of the engage male and female blocks 202, 204.

FIG. 2E illustrates the curved lips 250, 252 of the locking cover 246 fully inserted into the first and second grooves 242, 244 (FIG. 2D). The locking cover 246 is slid downward (downward in the figure) until the top edge 254 of the locking cover 246 engages the fifth sides 214, 228 (e.g., the tops) of the male and female blocks 202, 204. Friction between the locking cover 246 and the male and female blocks 202, 204 holds the male and female blocks 202, 204 together. A user can use his/her finger (e.g., the thumb) to engaged the ridge 254 to move the locking cover 246 along the male and female blocks 202, 204. In the illustrated examples, the first and second grooves 242, 244 are symmetrical and, thus, the locking cover 246 may be coupled to the engaged male and female blocks 202, 204 from either direction (e.g., from the sixth sides 216, 230 (FIG. 1)).

The left side wall 102 of the example dresser kit is illustrated in FIG. 3. The left side wall 102 has a front side edge 300, a rear side edge 302 opposite the front side edge 300, a top edge 304, a bottom edge 306 opposite the top edge 304, an inside surface 308 and an outside surface 310 (illustrated in FIG. 15). The left side wall 102 has a front leg 312 and a rear leg 314, which support the dresser 101 (FIG. 1) above a support surface (e.g., the floor). To couple the left side wall 102 to other walls to build the dresser 101 (FIG. 1) (discussed in further detail herein), the left side wall 102 includes a plurality of connector blocks (e.g., male block(s) and/or female block(s)) that are to be coupled with complementary (or counter) connector blocks (e.g., male block(s) and/or female block(s)) on the other walls. In the illustrated example, a first female block 204a, a second female block 204b and a third female block 204c are coupled to the inside surface 308 of the left side wall 102 near the rear side edge 302. The first, second and third female blocks 204a, 204b, 204c are coupled along their respective fourth sides (e.g., the fourth side 226 illustrated in FIG. 2A) to the left side wall 102, and the openings (e.g., the opening 232, as illustrated in FIG. 2A) of the respective first, second and third female blocks 204a, 204b, 204c facing outward from (e.g., are perpendicular to) the left side wall 102. The first sides (e.g., the first side 220, as illustrated in FIG. 2A) of the respective first, second and third female blocks 204a, 204b, 204c are facing toward the front side edge 300 of the left side wall 102. The first, second and third female blocks 204a, 204b, 204c are used to couple the left side wall 102 to the rear side wall 106 (FIG. 1) when assembling the dresser 101 (FIG. 1), as disclosed in further detail herein.

As illustrated in FIG. 3, a fourth male block 202*d*, a fifth male block 202*e* and a sixth male block 202*f* are coupled to the inside surface 308 of the left side wall 102 near the front side edge 300. The fourth, fifth and sixth male blocks 202*d*, 202*e*, 202*f* are coupled along their respective second sides (e.g., the second side 208, as illustrated in FIG. 2A) to the left side wall 102. The fourth, fifth and sixth male blocks 202*d*, 202*e*, 202*f* are oriented with their respective extensions (e.g., the extension 218, as illustrated in FIG. 2A) extending toward the front side edge 300. The fourth, fifth and sixth male blocks 202*d*, 202*e*, 202*f* are used to couple the left side wall 102 to the front side wall 108 (FIG. 1) when assembling the dresser 101 (FIG. 1), as disclosed in further detail herein. In the illustrated example, a seventh male block 202*g* is coupled to the inside surface 308 of the left side wall 102 near the top side edge 304. The seventh male block 202*g* is coupled along its second side (e.g., the second side 208, as illustrated in FIG. 2A) to the left side wall 102 with its extension (e.g., the extension 218, as illustrated in FIG. 2A) extending toward the top side edge 304. The seventh male block 202*g* is used to couple the left side wall 102 to the top wall 110 (FIG. 1) when assembling the dresser 101 (FIG. 1), as disclosed in further detail herein. The connector blocks 204*a*, 204*b*, 204*c*, 202*d*, 202*e*, 202*f*, 202*g* may be coupled to the left side wall 102 via screws or other fastening devices (e.g., through the example holes 234, 236, 238, 240 as illustrated in FIGS. 2A and 2B).

In the illustrated example, a first left rail 316, a second left rail 318, a third left rail 320 and a fourth left rail 322 coupled to the inside surface 308 of the left side wall 102. The first, second, third and fourth left rails 316, 318, 320, 322 enable the respective first, second, third and fourth drawers 112, 114, 116, 118 (FIG. 1) to slide within the dresser 101 (FIG. 1).

The right side wall 104 of the example dresser kit is illustrated in FIG. 4. Similar to the left side wall 102, the right side wall 104 has a front side edge 400, a rear side edge 402 opposite the front side edge 400, a top edge 404, a bottom edge 406 opposite the top edge 404, an inside surface 408 and an outside surface 410 (illustrated in FIG. 15). The right side wall 104 has a front leg 412 and a rear leg 414, which support the dresser 101 (FIG. 1) above a support surface (e.g., the floor). To couple the right side wall 104 to other walls to build the dresser 101 (FIG. 1) (discussed in further detail herein), the right side wall 104 includes a plurality of connector blocks (e.g., male block(s) and/or female block(s)) that are to be coupled with complementary (or counter) connector blocks (e.g., male block(s) and/or female block(s)) on the other walls. In the illustrated example, an eighth female block 204*h*, a ninth female block 204*i* and a tenth female block 204*j* are coupled to the inside surface 408 of the right side wall 104 near the rear side edge 402. The eighth, ninth and tenth female blocks 204*h*, 204*i*, 204*j* are coupled along their respective fourth sides (e.g., the fourth side 226, as illustrated in FIG. 2A) to the right side wall 104, and the openings (e.g., the opening 232, as illustrated in FIG. 2A) of the respective eighth, ninth and tenth female blocks 204*h*, 204*i*, 204*j* are facing outward from (e.g., are perpendicular to) the right side wall 104. The first sides (e.g., the first side 220, as illustrated in FIG. 2A) of the respective eighth, ninth and tenth female blocks 204*h*, 204*i*, 204*j* are facing toward the front side edge 400 of the right side wall 104. The eighth, ninth and tenth female blocks 204*h*, 204*i*, 204*j* are used to couple the right side wall 104 to the rear side wall 106 (FIG. 1) when assembling the dresser 101 (FIG. 1), as disclosed in further detail herein.

As illustrated in FIG. 4, an eleventh male block 202*k*, a twelfth male block 202*l* and a thirteenth male block 202*m* are coupled to the inside surface 408 of the right side wall 104 near the front side edge 400. The eleventh, twelfth and thirteenth male blocks 202*k*, 202*l*, 202*m* are oriented coupled along their respective second sides (e.g., the second side 208, as illustrated in FIG. 2A) to the right side wall 104. The eleventh, twelfth and thirteenth male blocks 202*k*, 202*l*, 202*m* are oriented with their respective extensions (e.g., the extension 218, as illustrated in FIG. 2A) extending toward the front side edge 400. The eleventh, twelfth and thirteenth male blocks 202*k*, 202*l*, 202*m* are used to couple the right side wall 104 to the front side wall 108 (FIG. 1) when assembling the dresser 101 (FIG. 1), as disclosed in further detail herein. In the illustrated example, a fourteenth male block 202*n* is coupled to the inside surface 408 of the right side wall 104 near the top side edge 404. The fourteenth male block 202*n* is coupled along its second side (e.g., the second side 208, as illustrated in FIG. 2A) to the right side wall 104 with its extension (e.g., the extension 218, as illustrated in FIG. 2A) extending toward the top side edge 404. The fourteenth male block 202*n* is used to couple the right side wall 104 to the top wall 110 (FIG. 1) when assembling the dresser 101 (FIG. 1), as disclosed in further detail herein. The connector blocks 204*h*, 204*i*, 204*j*, 202*k*, 202*l*, 202*m*, 202*n* may be coupled to the right side wall 104 via screws or other fastening devices (e.g., through the example holes 234, 236, 238, 240, as illustrated in FIGS. 2A and 2B).

In the illustrated example, a first right rail 416, a second right rail 418, a third right rail 420 and a fourth right rail 422 are coupled to the inside surface 408 of the right side wall 104. The first, second, third and fourth right rails 416, 418, 420, 422 enable the respective first, second, third and fourth drawers 112, 114, 116, 118 (FIG. 1) to slide within the dresser 101 (FIG. 1).

The rear wall 106 of the example dresser kit is illustrated in FIG. 5. The rear wall 106 has a left side edge 500, a right side edge 502 opposite the left side edge 500, a top edge 504, a bottom edge 506 opposite the top edge 504, an inside surface 508 and an outside surface 510 (illustrated in FIG. 17). To couple the rear wall 106 to other walls to build the dresser 101 (FIG. 1) (discussed in further detail herein), the rear wall 106 includes a plurality of connector blocks (e.g., male block(s) and/or female block(s)) that are to be coupled with complementary (or counter) connector blocks (e.g., male block(s) and/or female block(s)) on the other walls. In the illustrated example, a first male block 202*a*, a second male block 202*b*, and a third male block 202*c* are coupled to the inside surface 508 of the rear wall 106 near the left side edge 500. The first, second and third male blocks 202*a*, 202*b*, 202*c* are coupled along their respective fourth sides (the second side 208 illustrated in FIG. 2A) to the rear wall 106. The first, second and third male blocks 202*a*, 202*b*, 202*c* are oriented with their respective extensions (e.g., the extension 218, as illustrated in FIG. 2A) extending toward the left side edge 500. The first, second and third male blocks 202*a*, 202*b*, 202*c* are used to couple the rear wall 106 to the left side wall 102 (FIG. 1) when assembling the dresser 101 (FIG. 1). For example, the first, second and third male blocks 202*a*, 202*b*, 202*c* are to be coupled to the first, second and third female blocks 204*a*, 204*b*, 204*c* (as illustrated in FIG. 3), respectively, to join the rear wall 106 to the left side wall 102 (FIG. 3).

In the illustrated example, an eighth male block 202*h*, a ninth male block 202*i* and a tenth male block 202*j* are coupled to the inside surface 508 of the rear wall 106 near the right side edge 502. The eighth, ninth and tenth male blocks 202*h*, 202*i*, 202*j* are coupled along their respective second sides (e.g., the second side 208, as illustrated in FIG. 2A) to the rear wall 106. The eighth, ninth and tenth male blocks 202*h*, 202*i*, 202*j* are oriented with their respective extensions (e.g., the extension 218, as illustrated in FIG. 2A) extending toward the right side edge 502. The eighth, ninth and tenth male blocks 202*h*, 202*i*, 202*j* are used to couple the rear wall 106 to the right side wall 104 (FIG. 1) when assembling the dresser 101 (FIG. 1). For example, the eighth, ninth and tenth male blocks 202*h*, 202*i*, 202*j* are to be coupled to the eighth, ninth and tenth female blocks 204*h*, 204*i*, 204*j* (as illustrated in FIG. 4), respectively, to join the rear wall 106 to the right side wall 104 (FIG. 4). In the illustrated example, a fifteenth male block 202*o* is coupled to the inside surface 508 of the rear wall 106 near the top side edge 504. The fifteenth male block 202*o* is coupled along its second side (e.g., the second side 208, as illustrated in FIG. 2A) to the rear wall 106 and is oriented with its extension (e.g., the extension 218, as illustrated in FIG. 2A) extending toward the top side edge 504. The fifteenth male block 202*o* is used to couple the rear wall 106 to the top wall 110 (FIG. 1) when assembling the dresser 101 (FIG. 1), as disclosed in further detail herein. The connector blocks 202*a*, 202*b*, 202*c*, 202*h*, 202*i*, 202*j*, 202*o* may be coupled to the rear wall 106 via screws or other fastening devices (e.g., through the example holes 234, 236, as illustrated in FIG. 2A).

The front wall 108 of the example dresser kit is illustrated in FIG. 6. In the illustrated example, the front wall 108 is a trim or face plate that defines an opening for the drawers 112, 114, 116, 118 (FIG. 1). The front wall 108 has a left side edge 600, a right side edge 602 opposite the left side edge 600, a top edge 604, a bottom edge 606 opposite the top edge 604, an inside surface 608 and an outside surface 610 (illustrated in FIG. 19). The front wall 108 has a left leg 612 and a right leg 614, which support the dresser 101 (FIG. 1) above a support surface (e.g., the floor). To couple the front wall 108 to other walls to build the dresser 101 (FIG. 1) (discussed in further detail herein), the front wall 108 includes a plurality of connector blocks (e.g., male block(s) and/or female block(s)) that are to be coupled with complementary (or counter) connector blocks (e.g., male block(s) and/or female block(s)) on the other walls. In the illustrated example, a fourth female block 204*d*, a fifth female block 204*e* and a sixth female block 204*f* are coupled to the inside surface 608 of the front wall 108 near the left side edge 600. The fourth, fifth and sixth female blocks 204*d*, 204*e*, 204*f* are coupled along their respective fourth sides (e.g., the fourth side 226, as illustrated in FIG. 2A) to the front wall 108, and the openings (e.g., the opening 232, as illustrated in FIG. 2A) of the respective fourth, fifth and sixth female blocks 204*d*, 204*e*, 204*f* are facing outward from (e.g., are perpendicular to) the front wall 108. The first sides (e.g., the first side 220, as illustrated in FIG. 2A) of the respective fourth, fifth and sixth female blocks 204*d*, 204*e*, 204*f* are facing toward the right side edge 602 of the front wall 108. The fourth, fifth and sixth female blocks 204*d*, 204*e*, 204*f* are used to couple the front wall 108 to the left side wall 102 (FIG. 1) when assembling the dresser 101 (FIG. 1). For example, the fourth, fifth and sixth female blocks 204*d*, 204*e*, 204*f* are to be coupled to the fourth, fifth and sixth male blocks 202*d*, 202*e*, 202*f* (as illustrated in FIG. 3), respectively, to join the front wall 108 to the left side wall 102 (FIG. 3).

In the illustrated example, an eleventh female block 204*k*, a twelfth female block 204*l* and a thirteenth female block 204*m* are coupled to the inside surface 608 of the front wall 108 near the right side edge 602. The eleventh, twelfth and thirteenth female blocks 204*k*, 204*l*, 204*m* are coupled along their respective fourth sides (e.g., the fourth side 226, as illustrated in FIG. 2A) to the front wall 108, and the openings (e.g., the opening 232, as illustrated in FIG. 2A) of the respective eleventh, twelfth and thirteenth female blocks 204*k*, 204*l*, 204*m* are facing outward from (e.g., are perpendicular to) the front wall 108. The first sides (e.g., the first side 220, as illustrated in FIG. 2A) of the respective eleventh, twelfth and thirteenth female blocks 204*k*, 204*l*, 204*m* are facing toward the left side edge 600 of the front wall 108. The eleventh, twelfth and thirteenth female blocks 204*k*, 204*l*, 204*m* are used to couple the front wall 108 to the right side wall 104 (FIG. 1) when assembling the dresser 101 (FIG. 1). For example, the eleventh, twelfth and thirteenth female blocks 204*k*, 204*l*, 204*m* are to be coupled to the eleventh, twelfth and thirteenth male blocks 202*k*, 202*l*, 202*m* (as illustrated in FIG. 4), respectively, to join the front wall 108 to the right side wall 104 (FIG. 4). In the illustrated example, a sixteenth male block 202*p* is coupled to the inside surface 608 of the front wall 108 near the top side edge 604. The sixteenth male block 202*p* is coupled along its second side (e.g., the second side 208, as illustrated in FIG. 2A) to the front wall 108 with its extension (e.g., the extension 218, as illustrated in FIG. 2A) extending toward the top side edge 604. The sixteenth male block 202*p* is used to couple the front wall 108 to the top wall 110 (FIG. 1) when assembling the dresser 101 (FIG. 1), as disclosed in further detail herein. The connector blocks 204*d*, 204*e*, 204*f*, 204*k*, 204*l*, 204*m*, 202*p* may be coupled to the front wall 108 via screws or other fastening devices (e.g., through the example holes 234, 236, 238, 240 as illustrated in FIGS. 2A and 2B).

Figure 7:
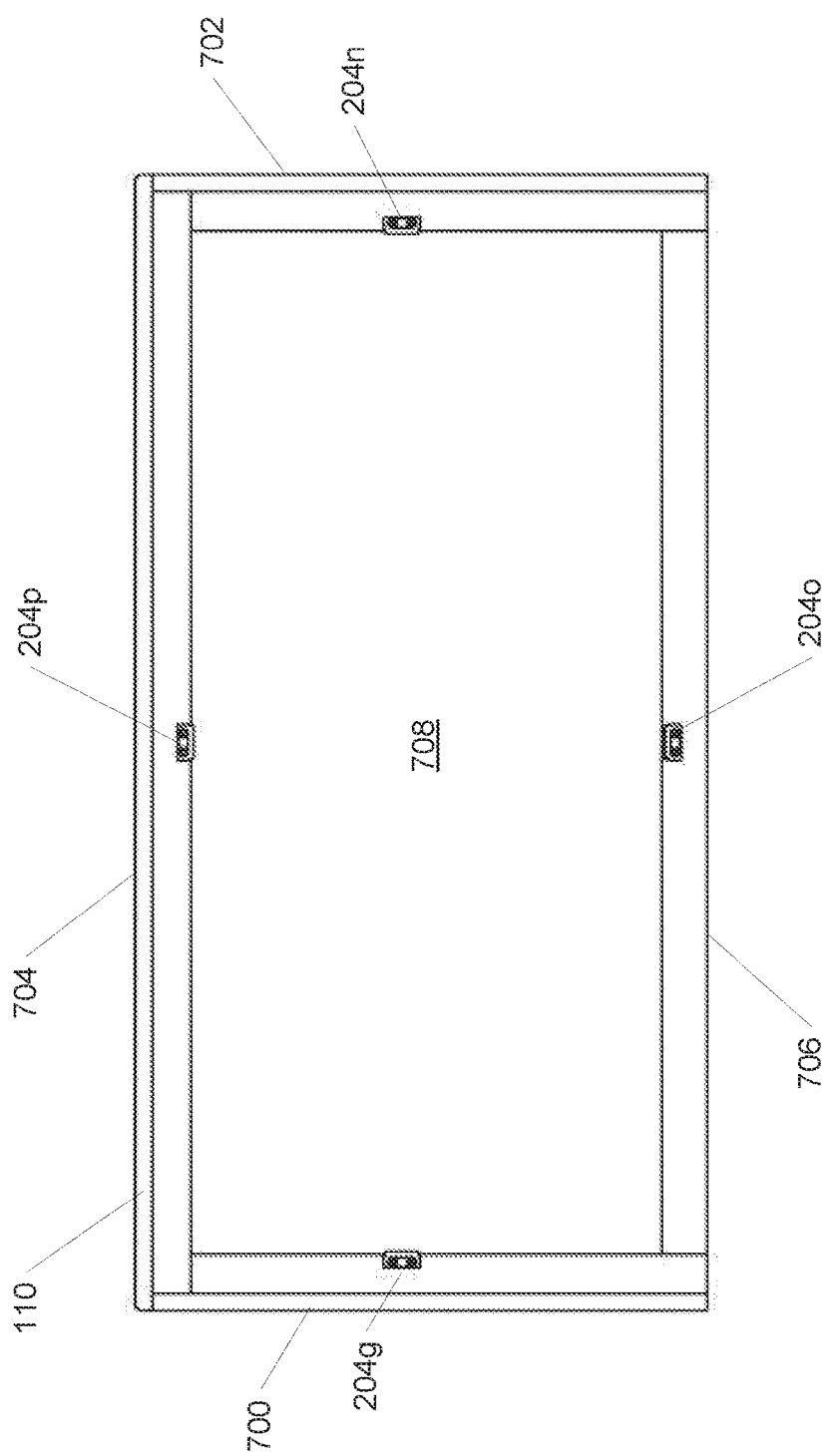
FIG. 7 is a side view of an example top wall of the example RTA furniture kit of FIG. 1 that may be used to build the example dresser.

The top wall 110 of the example dresser kit is illustrated in FIG. 7. The top wall 110 has a left side edge 700, a right side edge 702 opposite the left side edge 700, a front side edge 704, a rear side edge 706 opposite the front side edge 704, an inside surface 708 and an outside surface 710 (illustrated in FIG. 19) opposite the inside surface 708. To couple the top wall 110 to other walls to build the dresser 101 (FIG. 1) (discussed in further detail herein), the top wall 110 includes a plurality of connector blocks (e.g., male block(s) and/or female block(s)) that are to be coupled with complementary (or counter) connector blocks (e.g., male block(s) and/or female block(s)) on the other walls. In the illustrated example, a seventh female block 204*g*, a fourteenth female block 204*n*, a fifteenth female block 204*o* and a sixteenth female block 204*p* are coupled to the top wall 110. The seventh, fourteenth, fifteenth and sixteenth female blocks 204*g*, 204*n*, 204*o*, 204*p* are coupled along their fourth sides (e.g., the fourth side 226, as illustrated in FIG. 2A) to the inside surface 708 of the top wall, and the openings (e.g., the opening 232, as illustrated in FIG. 2A) of the respective seventh, fourteenth, fifteenth and sixteenth female blocks 204*g*, 204*n*, 204*o*, 204*p* are facing outwards from (e.g., perpendicular to) the top wall 110. In the illustrated example, the seventh female block 204*g* is coupled to the inside surface 708 of the top wall 110 near the left side edge 700. The first side (e.g., the first side 220, as illustrated in FIG. 2A) of the seventh female block 204*g* is facing toward the right side edge 702. During assembly (as disclosed in further detail herein), the seventh female block 204*g* is to be coupled to the seventh male block 202*g* (FIG. 3) to join the top wall 110 and the left side wall 102. In the illustrated example, the fourteenth female block 204*n* is coupled to the inside surface 708 of the top wall 110 near the right side edge 702. The first side (e.g., the first side 220, as illustrated in FIG. 2A) of the fourteenth female block 204n is facing toward the left side edge 700. During assembly, the fourteenth female block 204n is to be coupled to the fourteenth male block 202n (FIG. 4) to join the top wall 110 to the right side wall 104. In the illustrated example, the fifteenth female block 204o is coupled to the inside surface 708 of the top wall 110 near the rear side edge 706. The first side (e.g., the first side 220, as illustrated in FIG. 2A) of the fifteenth female block 204o is facing toward the front side edge 704. During assembly, the fifteenth female block 204o is to be coupled to the fifteenth male block 202o (FIG. 5) to join the top wall 110 and the rear wall 106. In the illustrated example, the sixteenth female block 204p is coupled to the inside surface 708 of the top wall 110 near the front side edge 704. The first side (e.g., the first side 220, as illustrated in FIG. 2A) of the sixteenth female block 204p is facing toward the rear side edge 706. During assembly, the sixteenth female block 204p is to be coupled to the sixteenth male block 202p (FIG. 6) to join the top wall 110 and the front wall 108. The connector blocks 204q, 204n, 204o, 204p may be coupled to the top wall 108 via screws or other fastening devices (e.g., through the example holes 238, 240, as illustrated in FIG. 2B).

The example walls 102, 104, 106, 108, 110 as illustrated in FIGS. 1, 3, 4, 5, 6 and 7, are included in the example kit and may be assembled to build the example dresser 101 of FIG. 1. The example kit also includes a plurality of walls or panels that may be assembled to build the first, second, third and fourth drawers.

FIGS. 8A and 8B illustrate a left side drawer wall 800 that may be included in the kit to build the example first drawer 112 (FIG. 1). The example left side drawer wall 800 has a front side edge 802, a rear side edge 804 opposite the front side edge 802, a top side edge 806, a bottom side edge 808 opposite the top side edge 806, an inside surface 810 and an outside surface 812 opposite the inside surface 810. To couple the front side edge 802 to a front drawer wall (as disclosed in further detail herein), the left side drawer wall 800 has a tongue 814 extending outward from the front side edge 802. On the outside surface 812, a left roller 816 is coupled at or near the bottom side edge 808. The left roller 816 is to engage the first left rail 316 (FIG. 3). On the inside surface 810, a slot 818 is provide that is parallel to and spaced from the bottom side edge 808. In the illustrated example, a seventeenth female block 204q is coupled to the inside surface 810 of the left side drawer wall 800 near the rear side edge 804. The seventeenth female block 204q is coupled along its fourth side (e.g., the fourth side 226, as illustrated in FIG. 2A) to the left side drawer wall 800, and the opening (e.g., the opening 232, as illustrated in FIG. 2A) of the seventeenth female block 204q is facing outward from (e.g., perpendicular to) from the left side drawer wall 800. The first side (e.g., the first side 220, as illustrated in FIG. 2A) of the seventeenth female block 204q is facing toward the rear side edge 804 of the left side drawer wall 800. The seventeenth female block 204q is used to couple the left side drawer wall 800 to a rear side wall when assembling the first drawer 112 (FIG. 1), as disclosed in further detail herein. The seventeenth female block 204q may be coupled to the left side drawer wall 800 via screws or other fastening devices (e.g., through the example holes 238, 240, as illustrated in FIG. 2B).

FIGS. 9A and 9B illustrate a right side drawer wall 900 that may be included in the kit to build the example first drawer 112 (FIG. 1). The example right side drawer wall 900 has a front side edge 902, a rear side edge 904 opposite the front side edge 902, a top side edge 906, a bottom side edge 908 opposite the top side edge 906, an inside surface 910 and an outside surface 912 opposite the inside surface 910. To couple the front side edge 902 to a front drawer wall (as disclosed in further detail herein), the right side drawer wall 900 has a tongue 914 extending outward from the front side edge 902. On the outside surface 912, a right roller 916 is coupled at or near the bottom side edge 908. The right roller 916 is to engage the first right rail 416 (FIG. 4). On the inside surface 910, a slot 918 is provide that is parallel to and spaced from the bottom side edge 808. In the illustrated example, an eighteenth female block 204r is coupled to the inside surface 910 of the right side drawer wall 900 near the rear side edge 904. The eighteenth female block 204r is coupled along its fourth side (e.g., the fourth side 226, as illustrated in FIG. 2A) to the right side drawer wall 900, and an opening (e.g., the opening 232, as illustrated in FIG. 2A) of the eighteenth female block 204r is facing outward from (e.g., perpendicular to) from the right side drawer wall 900. The first side (e.g., the first side 220, as illustrated in FIG. 2A) of the eighteenth female block 204r is facing toward the rear side edge 904 of the right side drawer wall 900. The eighteenth female block 204r is used to couple the right side drawer wall 900 to a rear side wall when assembling the first drawer 112 (FIG. 1), as disclosed in further detail herein. The eighteenth female block 204r may be coupled to the right side drawer wall 900 via screws or other fastening devices (e.g., through the example holes 238, 240, as illustrated in FIG. 2B).

Figure 10A:
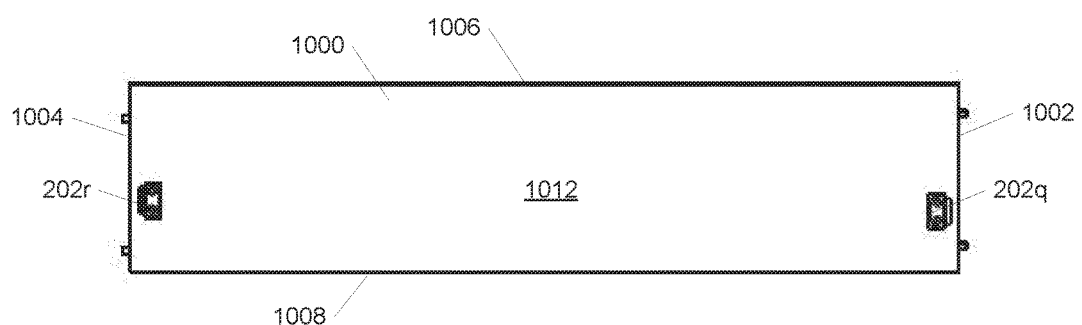
FIG. 10A is a side view of an example rear drawer wall of the example RTA furniture kit of FIG. 1 that may be used to build one of the example drawers.
Figure 10B:
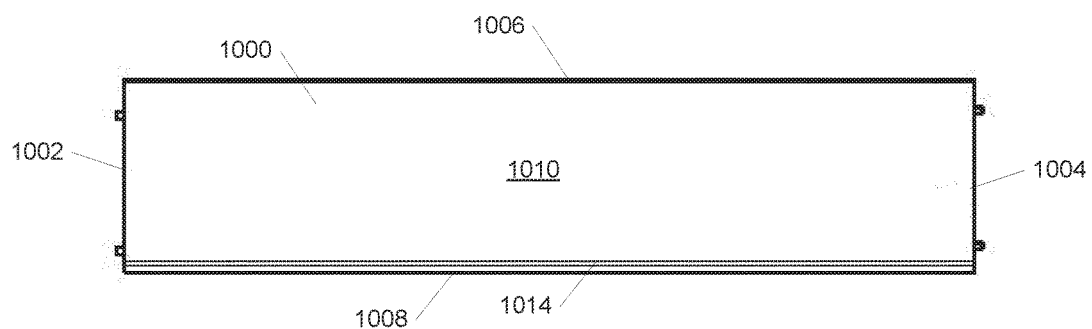
FIG. 10B is another side view of the example rear drawer wall of FIG. 10A, opposite of the side view in FIG. 10A.

FIGS. 10A and 10B illustrate a rear drawer wall 1000 that may be included in the kit to build the example first drawer 112 (FIG. 1). FIG. 10A is a rear side view of the rear drawer wall 1000 and FIG. 10B is a front side view of the rear drawer wall 1000. The example rear drawer wall 1000 has a left side edge 1002, a right side edge 1004 opposite the right side edge 1002, a top side edge 1006, a bottom side edge 1008 opposite the top side edge 1006, an inside surface 1010 and an outside surface 1012 opposite the inside surface 1010. On the inside surface 1010, a slot 1014 is provided that is parallel to and spaced from the bottom side edge 1008. In the illustrated example, a seventeenth male block 202q and an eighteenth male block 202r are coupled to the outside surface 1012 of the rear drawer wall 1010. The seventeenth and eighteenth male blocks 202q, 202r are coupled along their second sides (e.g., the second side 208, as illustrated in FIG. 2A) to the outside surface 1012. The seventeenth male block 202q is coupled near the left side edge 1002 and is oriented with its extension (e.g., the extension 218, as illustrated in FIG. 2A) facing toward the left side edge 1002. The seventeenth male block 202q is to be coupled to the seventeenth female block 204q (FIG. 8B) to join the rear drawer wall 1000 to the left side drawer wall 800 (FIG. 8A). The eighteenth male block 202r is coupled near the right side edge 1004 and is oriented with its extension (e.g., the extension 218, as illustrated in FIG. 2A) facing toward the right side edge 1004. The eighteenth male block 202r is to be coupled to the eighteenth female block 204r (FIG. 9B) to join the rear drawer wall 1000 to the right side drawer wall 900 (FIG. 9A). The seventeenth and eighteenth male blocks 202q, 202r may be coupled to the rear drawer wall 1000 via screws or other fastening devices (e.g., through the example holes 234, 236, as illustrated in FIG. 2A).

Figure 11:
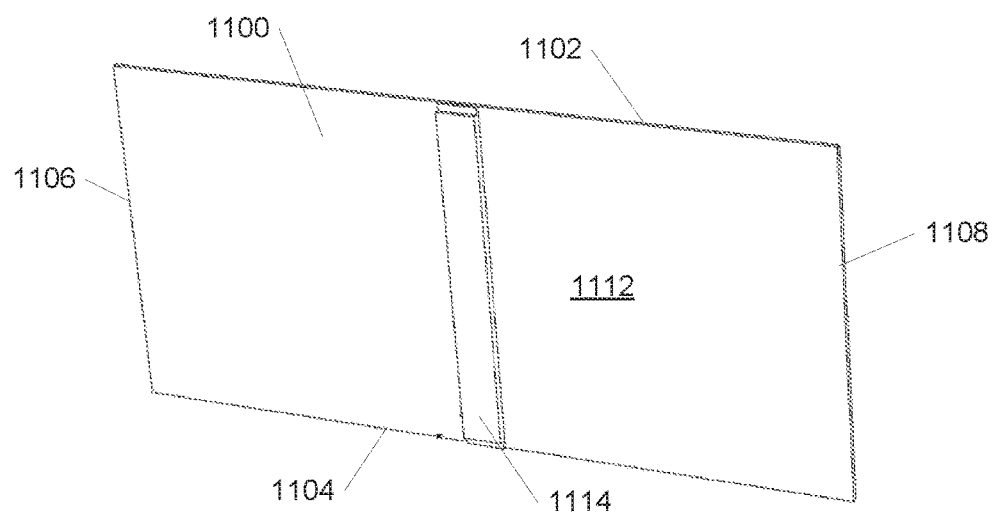
FIG. 11 is a perspective view of an example bottom drawer wall of the example RTA furniture kit of FIG. 1 that may be used to build one of the example drawers.

FIG. 11 illustrates a bottom drawer wall 1101 that may be included in the kit to build the example first drawer 112 (FIG. 1). The example bottom drawer wall 1100 has a front side edge 1102, a rear side edge 1104 opposite the front side edge 802, a left side edge 1106, a right side edge 1108 opposite the left side edge 1106, an inside surface 1110 (illustrated in FIG. 25) and an outside surface 1112 opposite the inside surface 1110. A support bar 1114 is coupled to the outside surface 1112 of the bottom drawer wall 1101 and is oriented parallel to the right and left side edges 1106, 1108.

Figure 12:
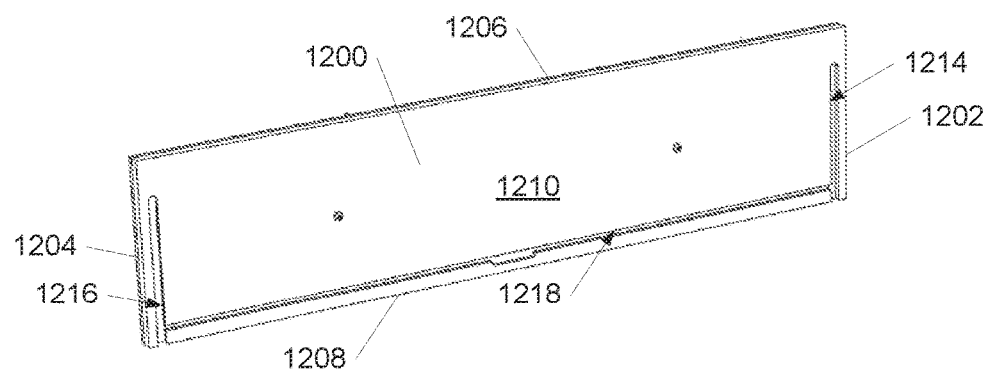
FIG. 12 is a perspective view of an example front drawer wall of the example RTA furniture kit of FIG. 1 that may be used to build one of the example drawers.

FIG. 12 illustrates a front drawer wall 1200 that may be included in the kit to build the example first drawer 112 (FIG. 1). The example front drawer wall 1200 has a left side edge 1202, a right side edge 1204 opposite the right side edge 1202, a top side edge 1206, a bottom side edge 1208 opposite the top side edge 1206, an inside surface 1210 and an outside surface 1212 (illustrated in FIG. 25) opposite the inside surface 1210. On the inside surface 1210, a left wall slot 1214 is provided that is parallel to and spaced from the left side edge 1202. The left wall slot 1214 is to receive the tongue 814 (FIG. 8A) of the left side drawer wall 800 when assembling the first drawer 112 (FIG. 1). On the inside surface 1210, a right wall slot 1216 is provided that is parallel to and spaced from the right side edge 1204. The right wall slot 1216 is to receive the tongue 916 (FIG. 9A) of the right side drawer wall 900 when assembling the first drawer 112 (FIG. 1). Also provided on the inside surface 1210 is a bottom wall slot 1218 that is parallel to and spaced from the bottom side edge 1208. The bottom wall slot 1218 is to receive the front side edge 1102 (FIG. 11) of the bottom drawer wall 1100 (FIG. 11) when assembling the first drawer 112 (FIG. 1).

The example left side drawer wall 800, right side drawer wall 900, rear drawer wall 1000, bottom drawer wall 1100 and front drawer wall 1200 of FIGS. 8A-12 are included in the example kit and may be assembled into the example first drawer 112 (FIG. 1). Similar to the first drawer 112 (FIG. 1), the second, third and fourth drawers 114, 116, 118 also have left, right, rear, front and bottom walls to form the respective drawers 114, 116, 118, and which are included in the example kit. However, for the sake of brevity, only the first drawer 112 and its elements are described herein. The second, third and fourth drawers 114, 116, 118 can be assembled with similar elements and in a similar manner as the first drawer 112.

Therefore, as illustrated in FIGS. 1-7, the example kit includes the left side wall 102, the right side wall 104, the rear wall 106, the front wall 108 and the top wall 110. The example kit may also include the walls for the first, second, third and fourth drawers 112, 114, 116, 118. For example, the kit may include four left side drawer walls (e.g., similar to the left side drawer wall 800 in FIG. 8A), four right side drawer walls (e.g., similar to the right side drawer wall 900 in FIG. 9A), four rear drawer walls (e.g., similar to the rear drawer wall 1000 in FIG. 10A), four bottom drawer walls (e.g., similar to the bottom drawer wall 1100 in FIG. 11) and four front drawer walls (e.g., similar to the front drawer wall 1200 in FIG. 12). The example kit also includes a plurality of locking covers (e.g., similar to the locking cover 246 in FIG. 2A) to couple the connector blocks together. In some examples, the kit also includes a plurality of knobs for the drawers, as disclosed in further detail herein. In some example there may be other number of drawer components for furniture that includes more or fewer drawers that the dresser 101.

Figure 13:
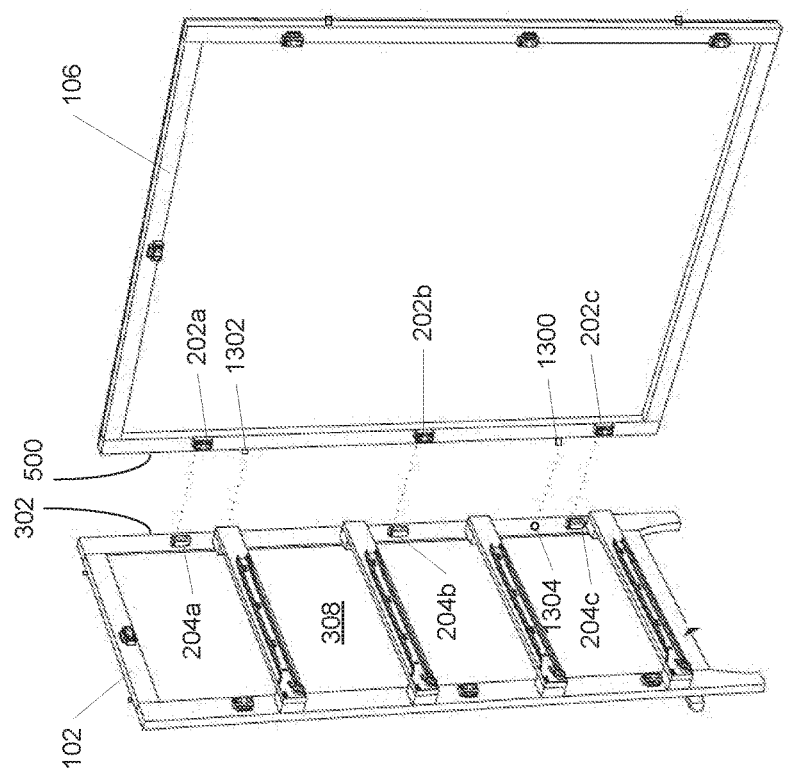
FIG. 13 is a perspective view of the example left side wall of FIG. 3 aligned with the rear wall of FIG. 5 during assembly of the example dresser of FIG. 1.
Figure 14:
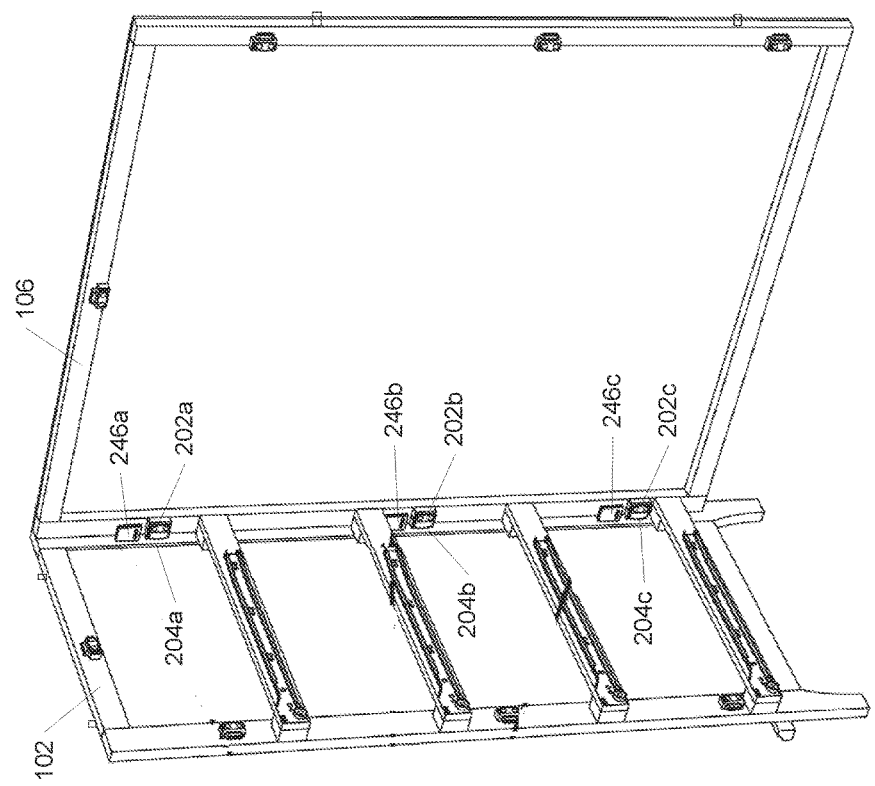
FIG. 14 is a perspective view of the example left side wall and rear wall of FIG. 13 being coupled.

FIGS. 13-26 illustrate an example sequence of assembling the elements or components of the example kit to build the dresser 101 (FIG. 1). This sequence may be performed by, for example, a customer who purchases the kit to build the dresser 101 (FIG. 1). As illustrated in FIG. 13, the left side wall 102 is to be coupled to the rear wall 106. The first, second and third male blocks 202a, 202b, 202c on the rear wall 106 are aligned with the respective first, second and third female blocks 204a, 204b, 204c on the left side wall 102, and the left side wall 102 and the rear wall 106 are moved together to insert the extensions (e.g., the extension 218, as illustrated in FIG. 2A) of the first, second and third male block 202a, 202b, 202c into the openings (the opening 232 as illustrated in FIG. 2A) of the respective first, second and third female blocks 204a, 204b, 204c, as illustrated in FIG. 14. In this configuration, the left side edge 500 of the rear wall 106 is facing and/or engaged with the inside surface 308 of the left side wall 102 at or near the rear side edge 302.

In some examples, the left side wall 102 and/or the rear wall 106 include holes and/or dowels (e.g., plugs, pegs) for primary or supplemental alignment. For example, in the illustrated example of FIG. 13, the rear wall 106 includes a first dowel 1300 and a second dowel 1302 that extend outward from the left side edge 500. The inside surface 308 of the left side wall 102 near the rear side edge 302 may include corresponding holes to receive the respective dowels 1300, 1302. For example, the left side wall 102 includes a first dowel hole 1304 to receive the first dowel 1300. Similarly, a second dowel hole may be provided to receive the second dowel 1302. The dowels 1300, 1302 may be glued to the corresponding holes, for example. In some examples, more or fewer dowels are utilized. In some examples, the dowels 1300, 1302 are previously coupled to the rear wall 106. In other examples, the dowels 1300, 1302 may be included in the example kit and the user may insert the dowels 1300, 1302 into holes in the left side edge 500 of the rear wall 106 and/or the left side wall 102 during assembly.

To further couple the first, second and third male blocks 202a, 202b, 202c to the respective first, second and third female blocks 204a, 204b, 204c, the example kit includes respective first, second and third locking covers 246a, 246b, 246c. This additional coupling secures the blocks 202a, 202b, 202c, 204a, 204b, 204c. As illustrated in FIG. 14, the first locking cover 246a may be slid onto the front sides (the front sides 206, 220 as illustrated in FIG. 2A) of the first male and female blocks 202a, 204a to couple the first male and female blocks 202a, 204a. To insert the curved lips (the curved lips 250, 252 as illustrated in FIG. 2A) of the first locking cover 246a into the respective grooves (the first and second grooves 242, 244 as illustrated in FIG. 2A) in the first male and female blocks 202a, 204a, the first locking cover 246a is moved in a vertical directional parallel to the rear wall 106. The first locking cover 246a may be coupled to the first male and female blocks 202a, 204a from the top or bottom. For example, a user may use his/her thumb to slide the first locking cover 246a (e.g., using the ridge 256 as illustrated in FIG. 2A) onto the front sides (the front sides 206, 220 as illustrated in FIG. 2A) of the first male and female blocks 202a, 204a. Similarly, the second locking cover 246b is slid over the front sides (the front sides 206, 220 as illustrated in FIG. 2A) of the second male and female blocks 202b, 204b to couple the second male and female blocks 202b, 204b, and the third locking cover 246c is slid over the front sides (the front sides 206, 220 as illustrated in FIG. 2A) of the third male and female blocks 202c, 204c to couple the third male and female blocks 202c, 204c.

Figure 15:
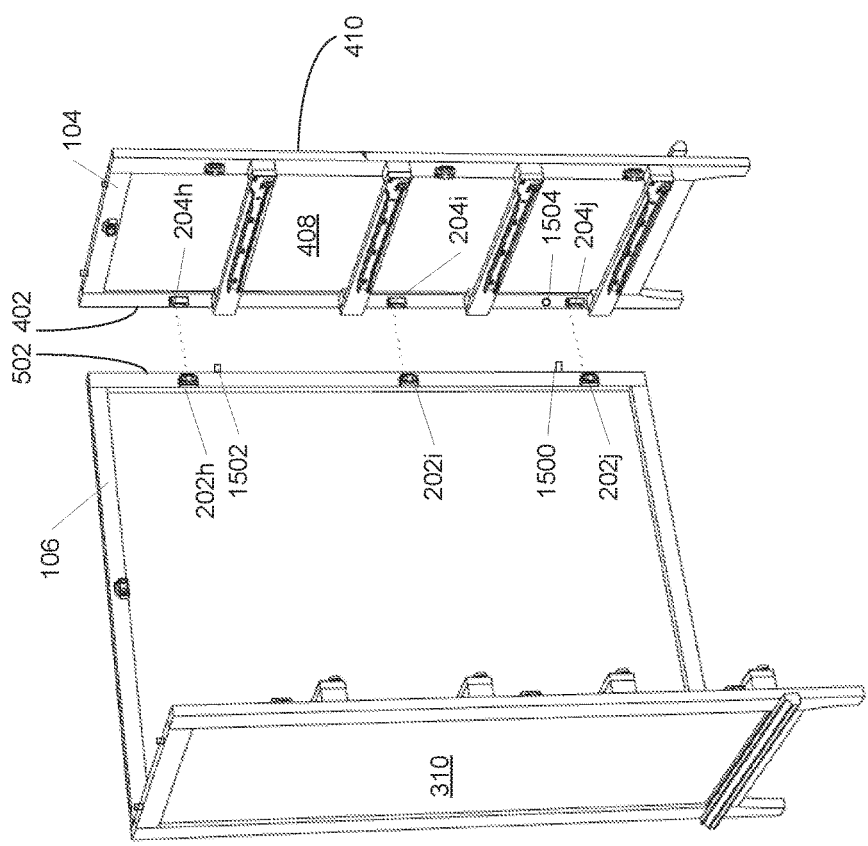
FIG. 15 is a perspective view of the example right side wall of FIG. 4 aligned with the example rear wall of FIG. 14 during assembly of the example dresser of FIG. 1.
Figure 16:
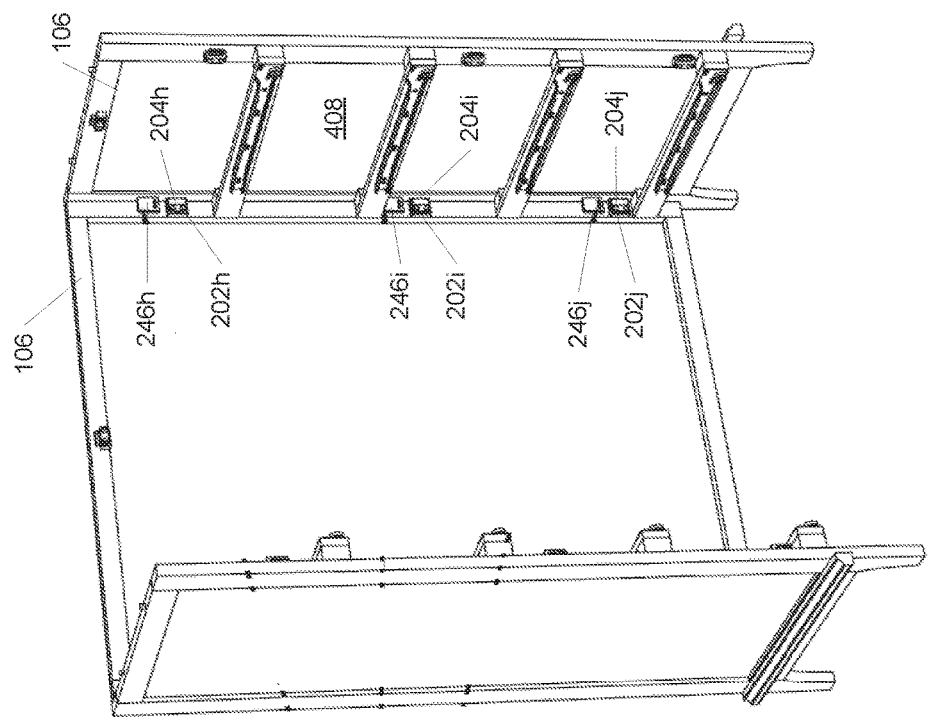
FIG. 16 is a perspective view of the example right side wall and rear wall of FIG. 15 being coupled.

As illustrated in FIG. 15, the right side wall 104 is to be coupled to the rear wall 106. The eighth, ninth and tenth male blocks 202h, 202i, 202j on the rear wall 106 are aligned with the respective eighth, ninth and tenth female blocks 204h, 204i, 204j on the right side wall 104, and the right side wall 104 and the rear wall 106 are moved together to insert the extensions (e.g., the extension 218, as illustrated in FIG. 2A) of the eighth, ninth and tenth male blocks 202h, 202i, 202j into the openings (the opening 232 as illustrated in FIG. 2A) of the respective eighth, ninth and tenth female blocks 204h, 204i, 204j, as illustrated in FIG. 16. In this configuration, the right side edge 502 of the rear wall 106 is facing and/or engaged with the inside surface 408 of the right side wall 104 at or near the rear side edge 402. In some examples, the right side wall 104 and/or the rear wall 106 include holes and/or dowels for primary or supplemental alignment. For example, in the illustrated example of FIG. 15, the rear wall 106 includes a third dowel 1500 and a fourth dowel 1502 that extend outward from the right side edge 502. The inside surface 408 of the right side wall 104 near the rear side edge 402 may include corresponding holes to receive the respective dowels 1500, 1502. For example, the right side wall 104 includes a third dowel hole 1504 to receive the third dowel 1500. Similarly, a fourth dowel hole may be provided to receive the fourth dowel 1502. The third and fourth dowels 1500, 1502 may be glued to the corresponding holes, for example. In some examples, more or fewer dowels are utilized. In some examples, the dowels 1500, 1502 are previously coupled to the rear wall 106. In other examples, the dowels 1500, 1502 may be included in the example kit and the user may insert the dowels 1500, 1502 into holes in the right side edge 502 of the rear wall 106 and/or the right side wall 104 during assembly.

To further couple the eighth, ninth and tenth male blocks 202h, 202i, 202j to the respective eighth, ninth and tenth female blocks 204h, 204i, 204j, the example kit includes respective eighth, ninth and tenth locking covers 246h, 246i, 246j. For example, as illustrated in FIG. 16, the eighth locking cover 246h is slid over the front sides (the front sides 206, 220 as illustrated in FIG. 2A) of the eighth male and female blocks 202h, 204h to couple the eighth male and female blocks 202h, 204h. To insert the curved lips (the curved lips 250, 252 as illustrated in FIG. 2A) of the eighth locking cover 246h into the respective grooves (the first and second grooves 242, 244 as illustrated in FIG. 2A) in the eighth male and female blocks 202h, 204h, the eighth locking cover 246h is moved in a vertical directional parallel to the rear wall 106. The eighth locking cover 246h may be coupled to the eighth male and female blocks 202h, 204h from the top or bottom. For example, a user may use his/her thumb to slide the eighth locking cover 246h (e.g., using the ridge 256 as illustrated in FIG. 2A) onto the front sides (the front sides 206, 220 as illustrated in FIG. 2A) of the eighth male and female blocks 202h, 204h. Likewise, the ninth locking cover 246i is slid over the front sides (the front sides 206, 220 as illustrated in FIG. 2A) of the ninth male and female blocks 202i, 204i to couple the ninth male and female blocks 202i, 204i, and the tenth locking cover 246j is slid over the front sides (the front sides 206, 220 as illustrated in FIG. 2A) of the tenth male and female blocks 202j, 204j to couple the tenth male and female blocks 202j, 204j.

Figure 18:
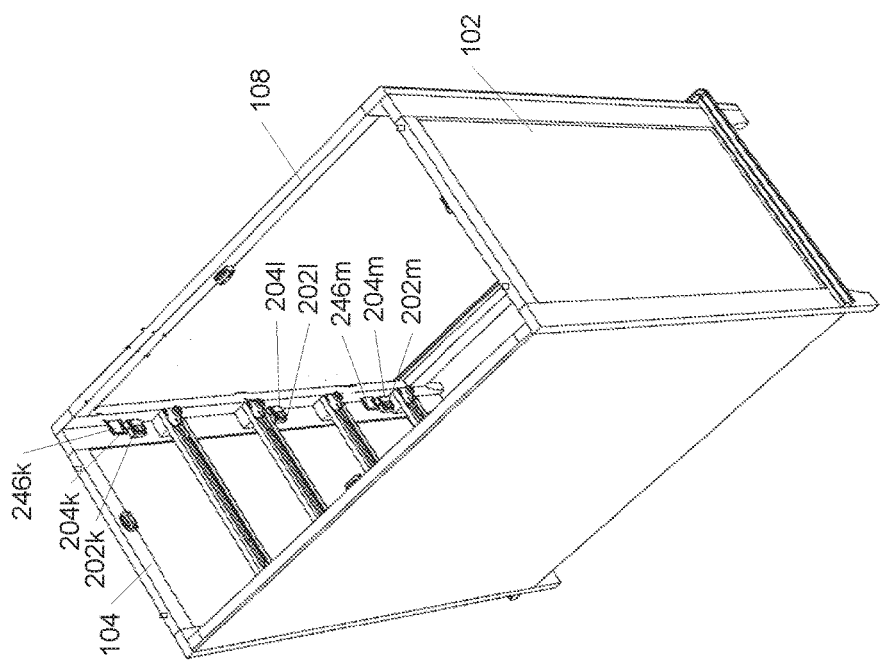
FIG. 18 is a top perspective view of the example front wall and left and right side walls of FIG. 17 being coupled.
Figure 17:
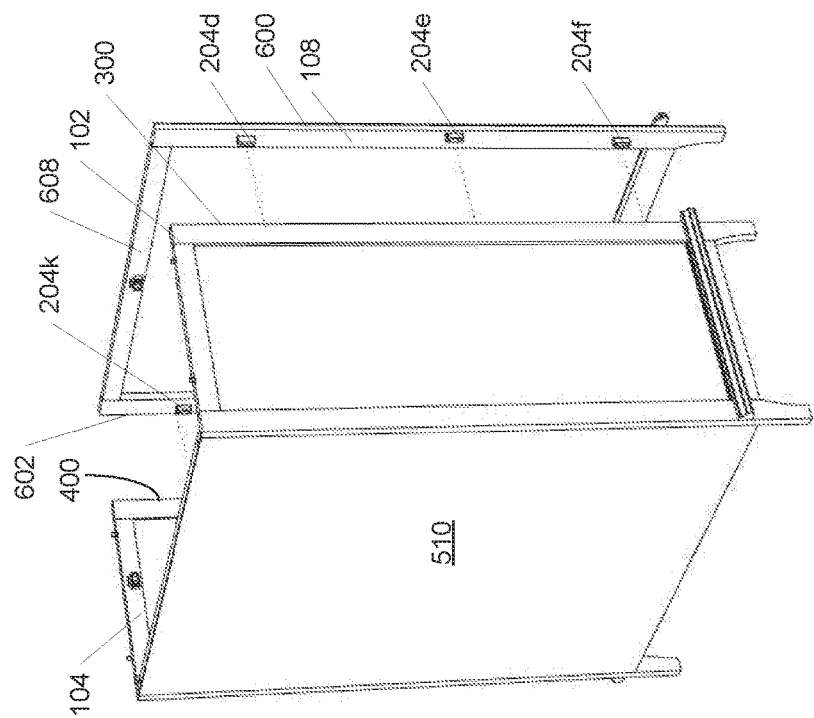
FIG. 17 is a perspective view of the example front wall of FIG. 6 aligned with the example left side wall and right side wall of FIG. 17 during assembly of the example dresser of FIG. 1.

As illustrated in FIG. 17, the front wall 108 is to be coupled to the left and right side walls 102, 104. The fourth, fifth and sixth female blocks 204d, 204e, 204f on the front wall 108 are aligned with the respective fourth, fifth and sixth male blocks 202d, 202e, 202f (as illustrated in FIG. 3) on the left side wall 102, and the eleventh, twelfth and thirteenth female blocks 204k 204l, 204m (FIG. 18) on the front wall 108 are aligned with the respective eleventh, twelfth and thirteenth male blocks 202k, 202l, 202m (FIG. 18) on the right side wall 106. As illustrated in FIGS. 17 and 18, the front wall 108 and first and second side walls 102, 104 are moved together to insert the extensions (e.g., the extension 218, as illustrated in FIG. 2A) of the fourth, fifth and sixth male blocks 202d, 202e, 202f (FIG. 3) into the openings (the opening 232 as illustrated in FIG. 2A) of the respective fourth, fifth sixth female blocks 204d, 204e, 204f, and insert the extensions (e.g., the extension 218, as illustrated in FIG. 2A) of the eleventh, twelfth and thirteenth male blocks 202k, 202l, 202m into the openings (the opening 232 as illustrated in FIG. 2A) of the respective eleventh, twelfth and thirteenth female blocks 204k, 204l, 204m. In this configuration, the front side edge 300 of the left side wall 102 is facing and/or engaged with the inside surface 608 of the front wall 108 at or near the left side edge 600, and the front side edge 400 of the right side wall 104 is facing and/or engaged with the inside surface 608 of the front wall 108 at or near the right side edge 602.

To further couple the eleventh, twelfth and thirteenth male blocks 202k, 202l, 202m to the respective eleventh, twelfth and thirteenth female blocks 204k, 204l, 204m, the example kit includes respective locking covers. For example, as illustrated in FIG. 18, an eleventh locking cover 246k is to slid over the front sides (the front sides 206, 220 as illustrated in FIG. 2A) of the eleventh male and female blocks 202k, 204k to couple the eleventh male and female blocks 202k, 204k. To insert the curved lips (the curved lips 250, 252 as illustrated in FIG. 2A) of the eleventh locking cover 246k into the respective grooves (the first and second grooves 242, 244 as illustrated in FIG. 2A) in the eleventh male and female blocks 202k, 204k, the eleventh locking cover 246k is moved in a vertical directional parallel to the right side wall 104. The eleventh locking cover 246k may be coupled to the eleventh male and female blocks 202k, 204k from the top or bottom. For example, a user may use his/her thumb to slide the eleventh locking cover 246k (e.g., using the ridge 256 as illustrated in FIG. 2A) onto the front sides (the front sides 206, 220 as illustrated in FIG. 2A) of the eleventh male and female blocks 202k, 204k. Likewise, a twelfth locking cover is to be slid over the front sides (the front sides 206, 220 as illustrated in FIG. 2A) of the twelfth male and female blocks 202l, 204l to couple the twelfth male and female blocks 202l, 204l, a thirteenth locking cover 246m is to be slid over the front sides (the front sides 206, 220 as illustrated in FIG. 2A) of the thirteenth male and female blocks 202m, 204m to couple the thirteenth male and female blocks 202m, 204m. Similarly, to couple the fourth, fifth and sixth male blocks 202d, 202e, 202f to the respective fourth, fifth and sixth female blocks 204d, 204e, 204f, the example kit includes respective locking covers. For example, a fourth locking cover is to be slid over the front sides (the front sides 206, 220 as illustrated in FIG. 2A) of the fourth male and female block 202d, 204d to couple the fourth male and female block 202d, 204d. The fourth locking cover may be moved in a direction that is parallel to the left side wall 102. Similarly, a fifth locking cover may be slid over the front sides (the front sides 206, 220 as illustrated in FIG. 2A) of the fifth male and female blocks 202e, 204e to couple the fifth male and female blocks 202e, 204e, and a sixth locking cover may be slid over the front sides (the front sides 206, 220 as illustrated in FIG. 2A) of the sixth male and female blocks 202f, 204f to couple the sixth male and female blocks 202.

Figure 19:
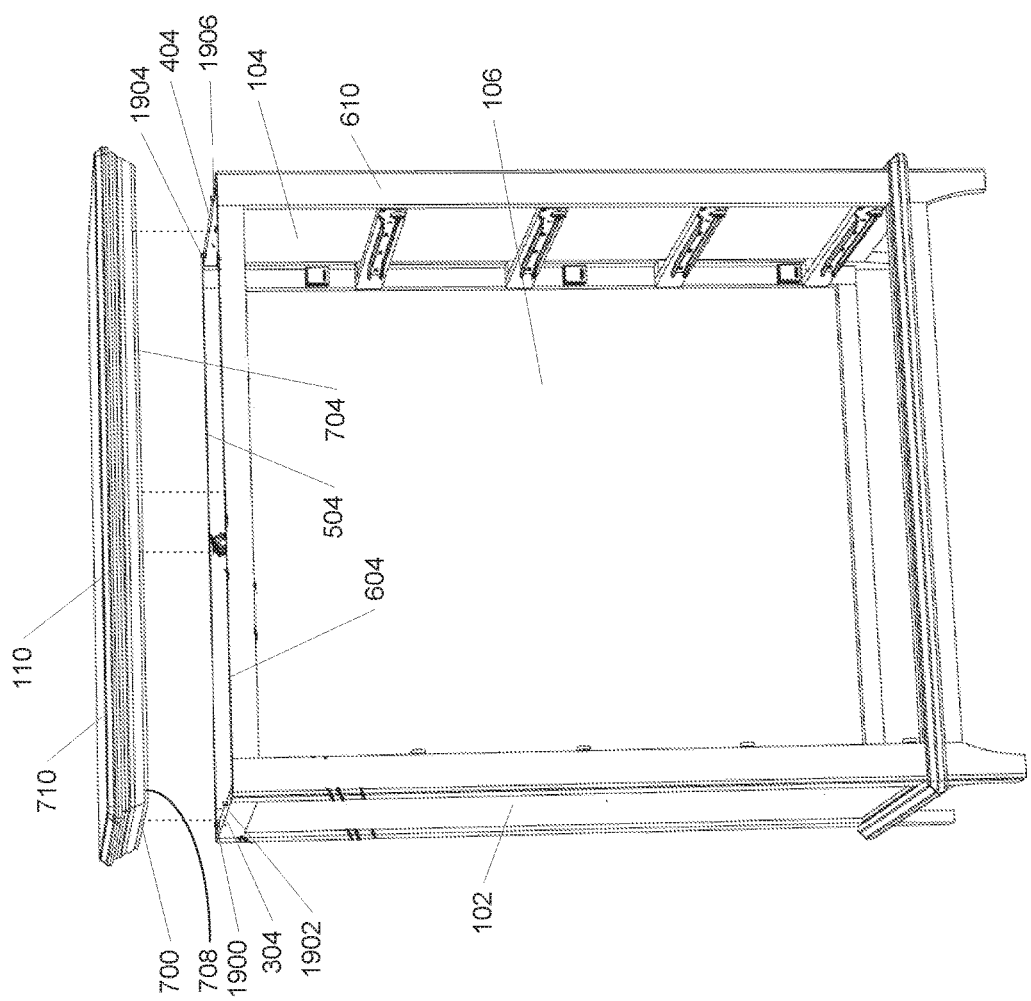
FIG. 19 is a front perspective view of the example top wall of FIG. 7 aligned with the example left side, right side, rear and front walls of FIG. 18 during assembly of the example dresser of FIG. 1.

As illustrated in FIG. 19, the top wall 110 is to be coupled to the left side, right side and rear walls 102, 104, 106. The seventh, fourteenth, fifteenth and sixteenth male blocks 202g, 202n, 202o, 202p (FIGS. 3-6) on the respective left side, right side, rear and front walls 102, 104, 106, 108 are aligned with the respective seventh, fourteenth, fifteenth and sixteenth female blocks 204g, 204n, 204o, 204p (as illustrated in FIG. 7) on the top wall 110. The top wall 110 and the left side, right side and rear walls 102, 104, 106 are moved together to insert the extensions (e.g., the extension 218, as illustrated in FIG. 2A) of the seventh, fourteenth, fifteenth and sixteenth male blocks 202g, 202n, 202o, 202p into the female (the opening 232 as illustrated in FIG. 2A) of the respective seventh, fourteenth, fifteenth and sixteenth female blocks 204g, 204n, 204o, 204p. In this configuration, the top side edge 304 of the left side wall 102 is facing and/or engaged with the inside surface 708 of the top wall 110 at or near the left side edge 700, the top side edge 404 of the right side wall 402 is facing and/or engaged with the inside surface 708 of the top wall 110 at or near the right side edge 702 (FIG. 7), the top side edge 504 of the rear wall 106 is facing and/or engaged with the inside surface 708 of the top wall 110 at or near the rear side edge 706 (FIG. 7), and the top side edge 604 of the front wall 108 is facing and/or engaged with the inside surface 708 of the top wall 110 at or near the front side edge 704.

In some examples, the left side wall 102, the right side wall 104, the rear wall 106, the front wall 108 and/or the top wall 110 include holes and/or dowels (e.g., plugs, pegs) for primary or supplemental alignment. For example, in the illustrated example of FIG. 19, the left side wall 102 includes a fifth dowel 1900 and a sixth dowel 1902 that extend from the top side edge 304 of the left side wall 102, and the right side wall 104 includes a seventh dowel 1904 and an eighth dowel 1906 that extend from the top side edge 404 of the right side wall 104. The inside surface 708 of the top wall 110 near the left and right side edges 700, 702 may include corresponding holes to receive the respective dowels 1900, 1902, 1904, 1906. The dowels 1900, 1902, 1904, 1906 may be glued to the corresponding holes, for example. In some examples, more or fewer dowels are utilized. In some examples, the dowels 1900, 1902, 1904, 1906 are previously coupled to the left and right side walls 102, 104. In other examples, the dowels 1900, 1902, 1904, 1906 may be included in the example kit and the user may insert the dowels 1900, 1902, 1904, 1906 into holes in the top side edges 304, 404 of the respective left and right side walls 102, 104 and/or in holes in the top wall 110 during assembly.

To further couple the seventh, fourteenth, fifteenth and sixteenth male blocks 202g, 202n, 202o, 202p (FIGS. 3-6) to the respective seventh, fourteenth, fifteenth and sixteenth female blocks 204g, 204n, 204o, 204p (FIG. 7), the example kit includes respective seventh, fourteenth, fifteenth and sixteenth locking covers. For example, a seventh locking cover may be slid over the front sides (the front sides 206, 220 as illustrated in FIG. 2A) of the seventh male and female blocks 202g, 204g to couple the seventh male and female blocks 202g, 204g. To insert the curved lips (the curved lips 250, 252 as illustrated in FIG. 2A) of the seventh locking cover into the respective grooves (the first and second grooves 242, 244 as illustrated in FIG. 2A) in the seventh male and female blocks 202g, 204g (FIGS. 3 and 7), the seventh locking cover is moved in a horizontal directional parallel to the left side wall 102. In other words, the seventh locking cover is oriented parallel to the left side wall 102. Further, a fourteenth locking cover is to be slid over the front sides (the front sides 206, 220 as illustrated in FIG. 2A) of the fourteenth male and female blocks 202n, 204n to couple the fourteenth male and female blocks 202n, 204n. The fourteenth locking cover is oriented parallel to the right side wall 104. A fifteenth locking cover is to be slid over the front sides (the front sides 206, 220 as illustrated in FIG. 2A) of the fifteenth male and female blocks 202o, 204o to couple the fifteenth male and female blocks 202o, 204o. The fifteenth locking cover is oriented parallel to the rear wall 106. A sixteenth locking cover is to be slid over the front sides (the front sides 206, 220 as illustrated in FIG. 2A) of the sixteenth male and female blocks 202p, 204p to couple the sixteenth male and female blocks 202p, 204p. The sixteenth locking cover is oriented parallel to the front wall 108.

Figure 20:
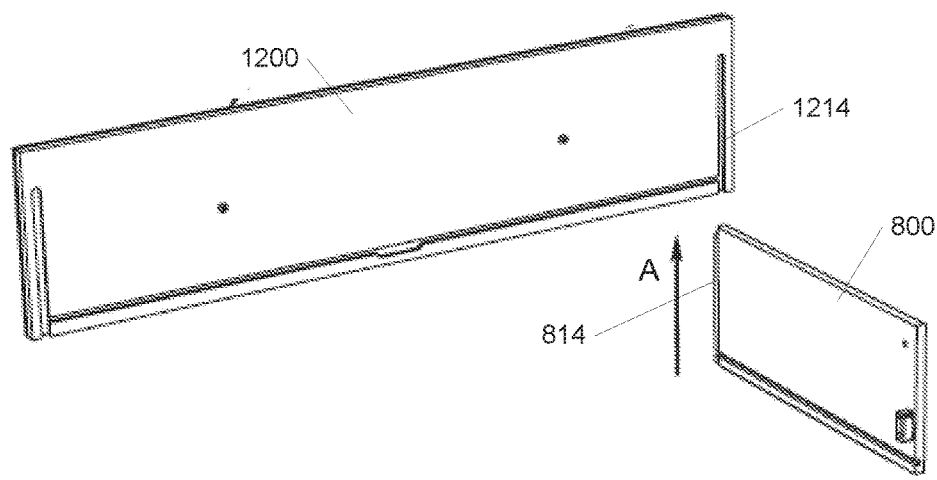
FIG. 20 is a perspective view of the example left side drawer wall of FIG. 8A aligned with the example front drawer wall of FIG. 12 during assembly of one of the example drawers of FIG. 1.
Figure 21:
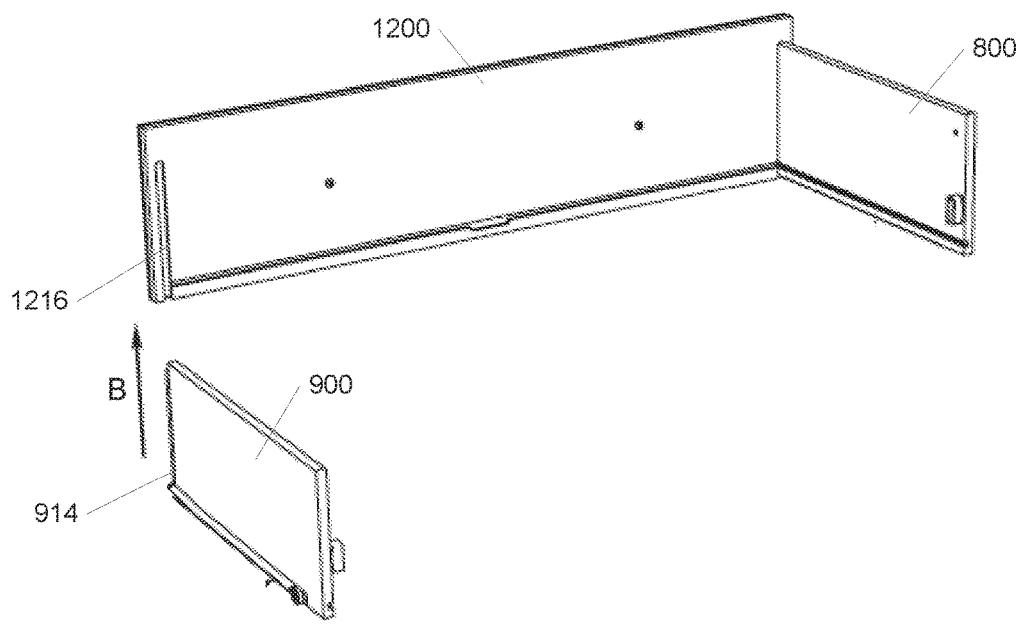
FIG. 21 is a perspective view of the example left side drawer wall of FIG. 20 coupled to the example front drawer wall of FIG. 20, and the example right side drawer wall of FIG. 9A being aligned with the example front drawer wall during assembly of one of the example drawers of FIG. 1.

FIGS. 20-24 illustrate an example sequence of assembling the elements or components of the example kit to build the example first drawer 112 (FIG. 1) of the example dresser 101 (FIG. 1). As illustrated in FIG. 20, the left side drawer wall 800 is to be coupled to the front drawer wall 1200 by aligning the tongue 814 of the left side drawer wall 800 with the left wall slot 1214 of the front drawer wall 1200. The tongue 812 is to be slid into the left wall slot 1214 (in the direction of arrow A). FIG. 21 illustrates the left side drawer wall 800 as engaged with the front drawer wall 1200. In the illustrated example, the left side drawer wall 800 extends perpendicular to the front drawer wall 1200. Similarly, to couple the right side drawer wall 900 to the front drawer wall 1200, the tongue 914 of the right side drawer wall 900 is aligned with the right wall slot 1216 of the front drawer wall 1200. The tongue 914 is to be slid into the right wall slot 1216 (in the direction of arrow B). When engaged, the right side drawer wall 900 extends perpendicular to the front drawer wall 1200 and parallel to the left side drawer wall 800.

Figure 22:
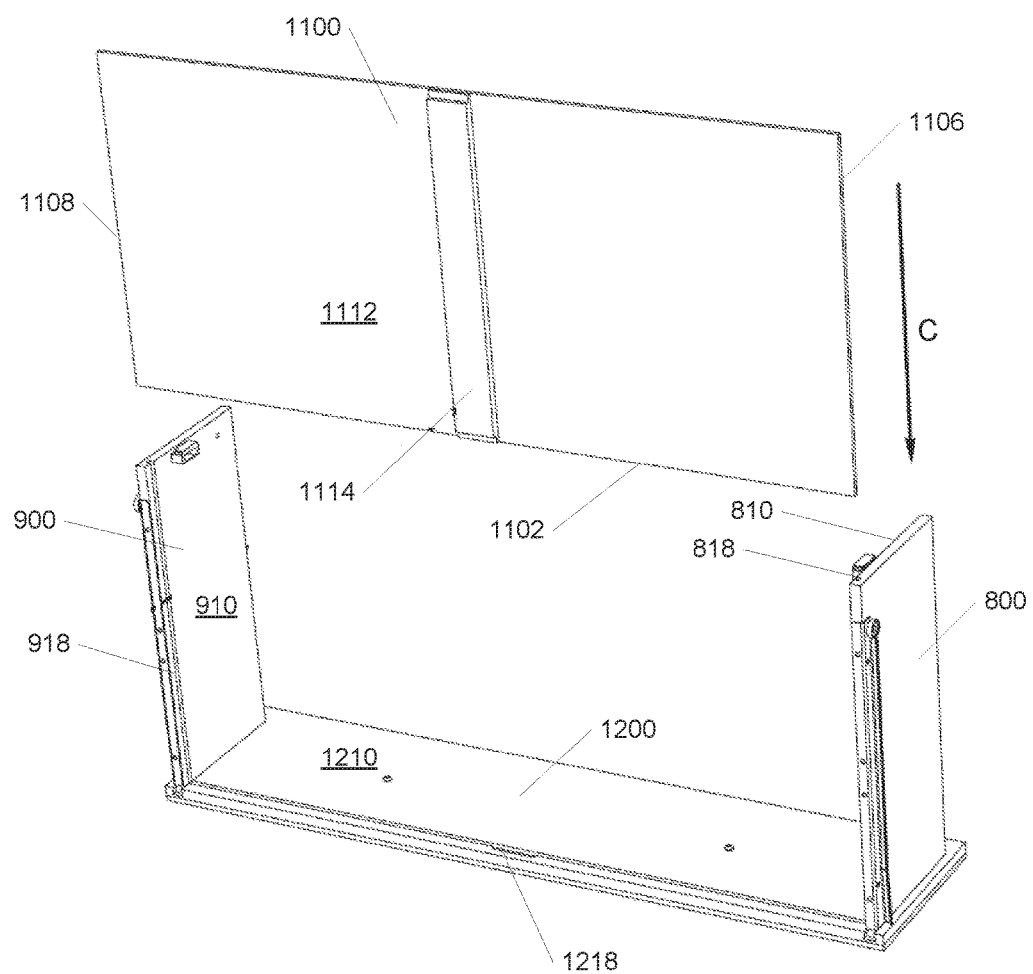
FIG. 22 is a bottom perspective view of the example bottom drawer wall of FIG. 11 being aligned with the example left side drawer, right side drawer and front drawer walls of FIG. 21 during assembly of one of the example drawers of FIG. 1.

As illustrated in FIG. 22, to couple the bottom drawer wall 1100 to the left side drawer, the right side drawer and the front drawer walls 800, 900, 1200, the left side edge 1106 of the bottom drawer wall 1101 is aligned with the slot 818 on the inside surface 810 of the left side drawer wall 800 and the right side edge 1108 of the bottom drawer wall 1100 is aligned with the slot 918 on the inside surface 910 of the right side drawer wall 900. The bottom drawer wall 1100 is moved (in the direction of arrow C) toward the front drawer wall 1200 until the front side edge 1102 of the bottom drawer wall 1100 is engaged with the bottom wall slot 1218 on the inside surface 1210 of the front drawer wall 1200, as illustrated in the configuration in FIG. 23. The support bar 1114 on the outside surface 1112 of the bottom drawer wall 1101 is to engage a notch in the bottom wall slot 1218, which is shaped to receive the support bar 1114.

Figure 23:
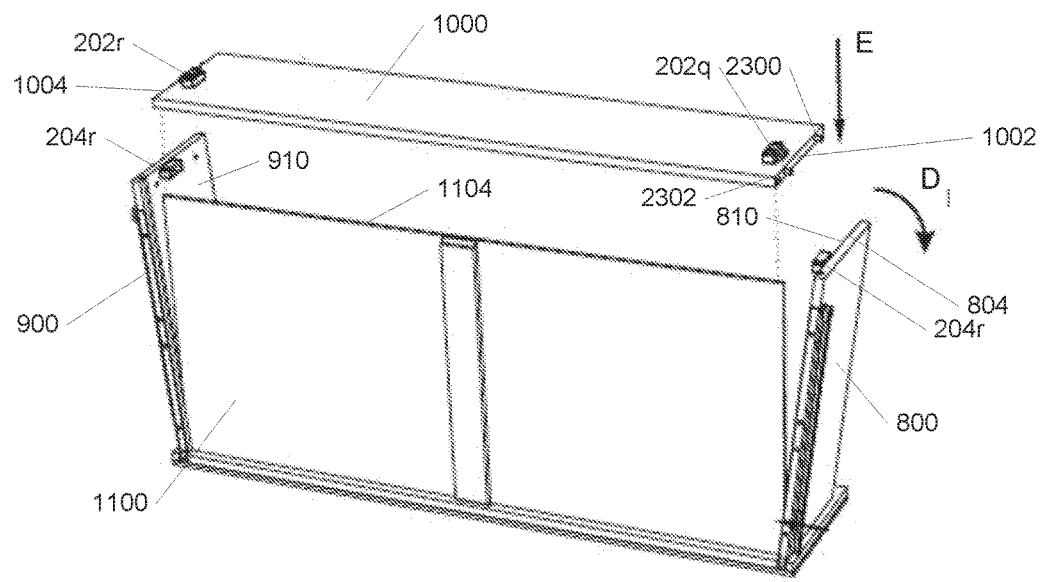
FIG. 23 is a bottom perspective view of the example bottom drawer wall and front drawer wall of FIG. 22 being coupled, and the rear drawer wall of FIG. 10 being aligned with the example left and right side drawer walls of FIG. 22 during assembly of one of the example drawers of FIG. 1.

To couple the rear drawer wall 1000 to the left and right side drawer walls 800, 900, the left and right side drawer walls 800, 900 are to be angled outward, as illustrated in FIG. 23 (e.g., the left side drawer wall 800 is titled in the direction of arrow D), to enable the rear drawer wall 1000 to be moved (in the direction of arrow E) between the left and right side drawer walls 800, 900. The seventeenth male block 202q on the rear drawer wall 1000 is to be aligned with the seventeenth female block 204q on the left side drawer wall 800, and the eighteenth male block 202r on the rear drawer wall 1000 is to be aligned with the eighteenth female block 204r on the right side drawer wall 900. The left and right side drawer walls 800, 900 are to be moved back toward each other (e.g., the left side drawer wall 800 is to be moved in a direction opposite of arrow D) to insert the extensions (e.g., the extension 218, as illustrated in FIG. 2A) of the seventeenth and eighteenth male blocks 202q, 202r into the openings (the opening 232 as illustrated in FIG. 2A) of the respective seventeenth and eighteenth female blocks 204q, 204r, as illustrated in the configuration in FIG. 24. The rear side edge 1104 of the bottom drawer wall 1100 is inserted into the slot 1014 (FIG. 10B) on the inside surface 1012 (FIG. 10B) of the rear drawer wall 1000. In this configuration, the left side edge 1002 of the rear drawer wall 1000 is facing and/or engaged with the inside surface 810 of the left side drawer wall 800 at or near the rear side edge 804 of the left side drawer wall 800. Further, the right side edge 1004 of the rear drawer wall 1000 is facing and/or engaged with the inside surface 910 of the right side drawer wall 900 at or near the rear side edge 904 of the right side drawer wall 900.

In some examples, the left side drawer wall 800, the right side drawer wall 900 and/or the rear drawer wall 1000 include holes and/or dowels (e.g., plugs, pegs) for primary or supplemental alignment. For example, in the illustrated example of FIG. 23, the rear drawer wall 1000 includes a ninth dowel 2300 and a tenth dowel 2302 that extend outward from the left side edge 1002. The inside surface 810 of the left side drawer wall 800 near the rear side edge 804 may include corresponding holes to receive the respective dowels 2300, 2302. For example, as illustrated in FIG. 8B, the left side drawer wall 800 includes a ninth dowel hole 2304 to receive the ninth dowel 2300. Similarly, a tenth dowel hole may be provided to receive the tenth dowel 2302. The dowels 2300, 2302 may be glued to the corresponding holes, for example. In some examples, more or fewer dowels are utilized. In some examples, the dowels 2300, 2302 are previously coupled to the rear drawer wall 1000. In other examples, the dowels 2300, 2302 may be included in the example kit and the user may insert the dowels 2300, 2302 into holes in the left side edge 1002 of the rear drawer wall 1000 and/or the left side drawer wall 800 during assembly. Similarly, the right side edge 1004 of the rear drawer wall 1000 may have eleventh and twelfth dowels to be received in corresponding dowel holes in the right side drawer wall 900.

To further couple the seventeenth and eighteenth male blocks 202q, 202r to the respective seventeenth and eighteenth female blocks 204q, 204r, the example kit includes respective locking covers. For example, a seventeenth locking cover is to be slid onto the front sides (the front sides 206, 220 as illustrated in FIG. 2A) of the seventeenth male and female blocks 202q, 204q to couple the seventeenth male and female blocks 202q, 204q. To insert the curved lips (the curved lips 250, 252 as illustrated in FIG. 2A) of the seventeenth locking cover into the respective grooves (the first and second grooves 242, 244 as illustrated in FIG. 2A) in the seventeenth male and female blocks 202q, 204q, the seventeenth locking cover is moved in a vertical directional parallel to the rear drawer wall 1000. The first locking cover 246a may be coupled to the seventeenth male and female blocks 202q, 204q from the top (e.g., in a direction toward the bottom side edge 1008 (FIG. 10A)) or from the bottom (e.g., in a direction toward the top side edge 1006 (FIG. 10A)).

Figure 25:
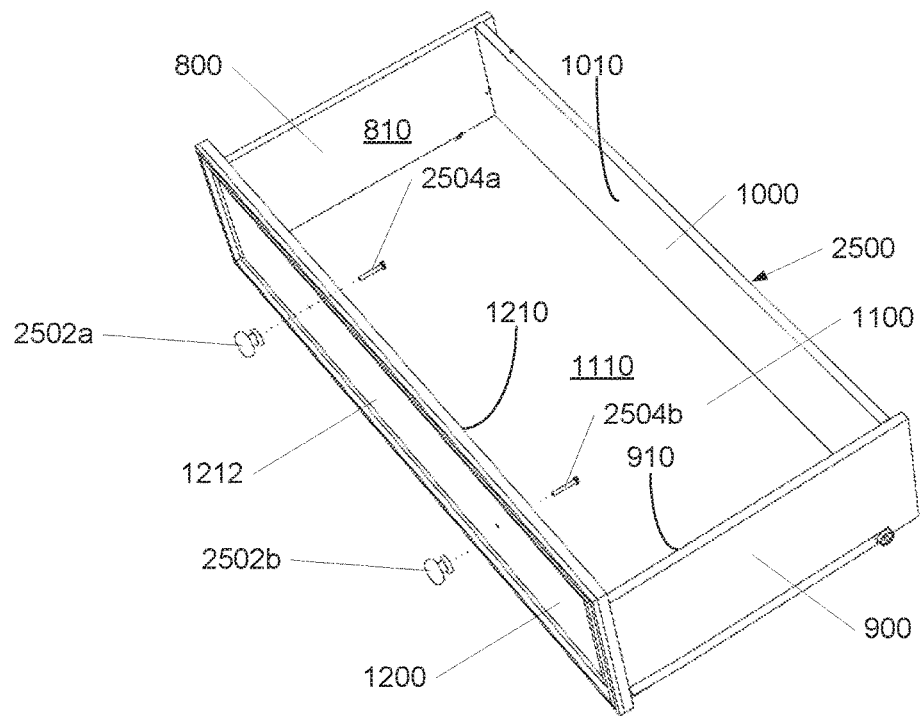
FIG. 25 is a top perspective view of one of the example drawers of FIG. 1, and example knobs being coupled to the example drawer.

As illustrated in FIG. 25, the inside surfaces 810, 910, 1010, 1110, 1210 of the respective left side drawer, right side drawer, rear drawer, bottom drawer and front drawer walls 800, 900, 1010, 1101, 1200 define a cavity 2500. One or more knobs may be coupled to the outside surface 1212 of the front drawer wall 1200. As illustrated in FIG. 25, a first knob 2502a is to be coupled to the outside surface 1212 via a first screw 2504a and a second knob 2502b is to be coupled to the outside surface 1212 via a second screw 2504b. However, in other examples, others types of fastening devices (e.g., a nail, an adhesive) may be implemented to couple the knobs 2502a, 2502b to the front drawer wall 1200. In some examples, no knobs are included. In other examples, more or fewer knobs are included.

Figure 26:
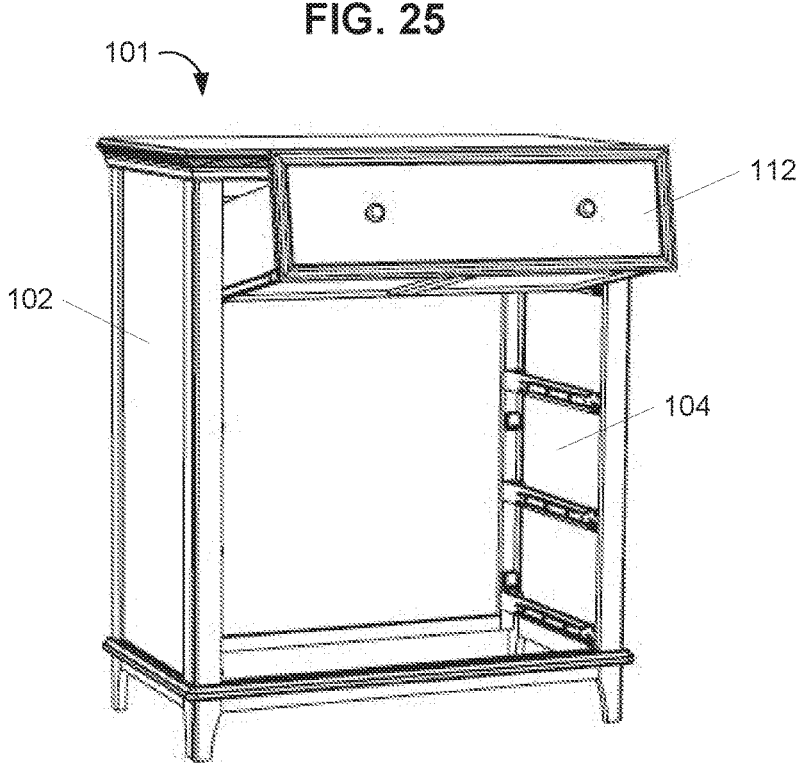
FIG. 26 is a perspective view of the example dresser of FIG. 1 receiving the example drawer of FIG. 25.

As disclosed herein, the second, third and fourth drawers 114, 116, 118 (FIG. 1) may be assembled similarly to the first drawer 112 (FIG. 1). FIG. 26 illustrates the first drawer 112 being inserted into the dresser 101. When assembled, the first drawer 112 (FIG. 1) may be inserted into the assembled dresser 101. In particular, the left roller 816 (FIG. 8A) is to be inserted into the first left rail 316 (FIG. 3) and is moveable (back-and-forth) along an axis (e.g., a first axis) of the first left rail 316, and the right roller 916 (FIG. 9A) is to be inserted into the first right rail 416 (FIG. 4) and is movable (back-and-forth) along an axis of the first right rail 416. In such an arrangement, the first locking cover 246a (FIG. 14) is to be slid onto the first and second blocks 202a, 204a (FIG. 14) along an axis (e.g., a second axis) that is orthogonal to the axes along which the left and right rollers 816, 916 (FIGS. 8A and 9A) move in the respective first left and right rails 316, 416 (FIGS. 3 and 4). The second, third and fourth drawers 114, 116, 118 may likewise be assembled and inserted into the dresser 101.

In the illustrated example, three block connectors are provided near each the sides of the left side, right side, rear and front walls 102, 104, 106, 108 to couple the left side, right side, rear and front walls 102, 104, 106, 108 to the other of the left side, right side, rear and front walls 102, 104, 106, 108. In other examples, more or fewer block connectors may be used. For example, two female blocks may be used to couple the left side wall 102 to the rear wall 106. In some examples, each of the walls 102, 104, 106, 108 may be coupled to each other using the same number of block connectors. In other examples, one or more of the walls 102, 104, 106, 108 may be coupled to the other walls 102, 104, 106, 108 with more or fewer block connectors than the other walls 102, 104, 106, 108. In the illustrated example, one block connector is provided on each of the left side, right side, rear and front walls 102, 104, 106, 108 to couple the walls 102, 104, 106, 108 to the top wall 110. In other examples, more block connectors may be used on any of the walls 102, 104, 106, 108 to couple the walls 102, 104, 106, 108 to the top wall 110. In some examples, the block connectors one the left side, right side, rear, front and top 102, 104, 106, 108, 110 walls may also be positioned at different locations (e.g., closer to or further from the edges of the respective walls). In some examples, the configurations of the male and female blocks may be switched. For example, three male blocks may be provided near the rear side edge 302 of the left side wall 102, and three corresponding female blocks may be provided near the left side edge 500 of the rear wall 106. In such an example, the orientation of the corresponding locking covers may also change. In some examples, more or fewer drawers may be used (e.g., two drawers, eight drawers, etc.). In some examples, more or fewer block connectors may be used to couple the rear drawer wall 1000 to the left and right side drawer walls 800, 900. In some examples, block connectors may be used to couple the other walls of the drawer to each other. For example, the bottom drawer wall 1100 may be coupled to the left and right side drawer walls 800, 900 using example connectors 200.

Figure 27:
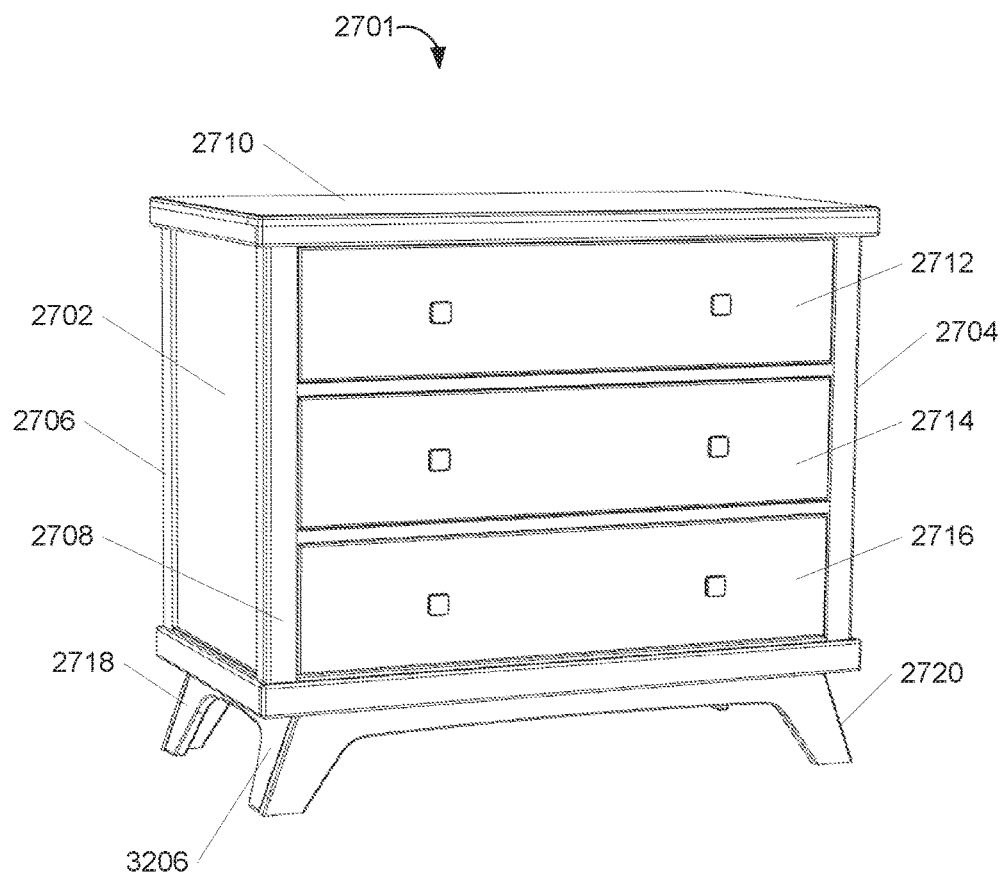
FIG. 27 is a perspective view of another example dresser with side braces that has been assembled with an example RTA furniture kit in accordance with the teachings of this disclosure.
Figure 29:
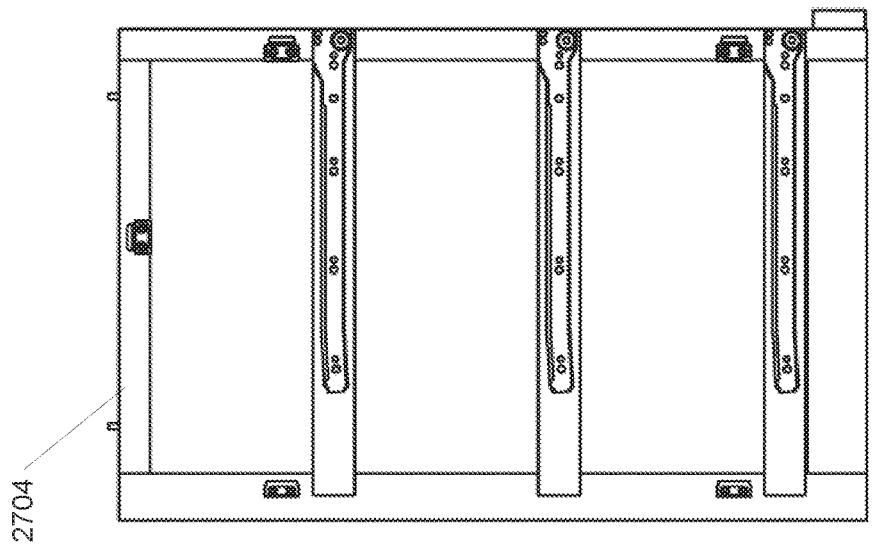
FIG. 29 is a side view of an example right side wall of the example RTA furniture kit of FIG. 27 that may be used to build the example dresser.
Figure 28:
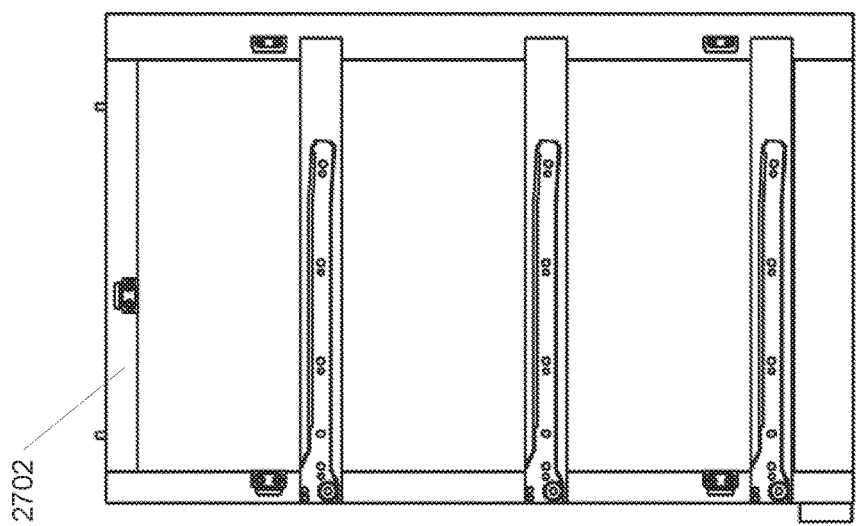
FIG. 28 is a side view of an example left side wall of the example RTA furniture kit of FIG. 27 that may be used to build the example dresser.
Figure 31:
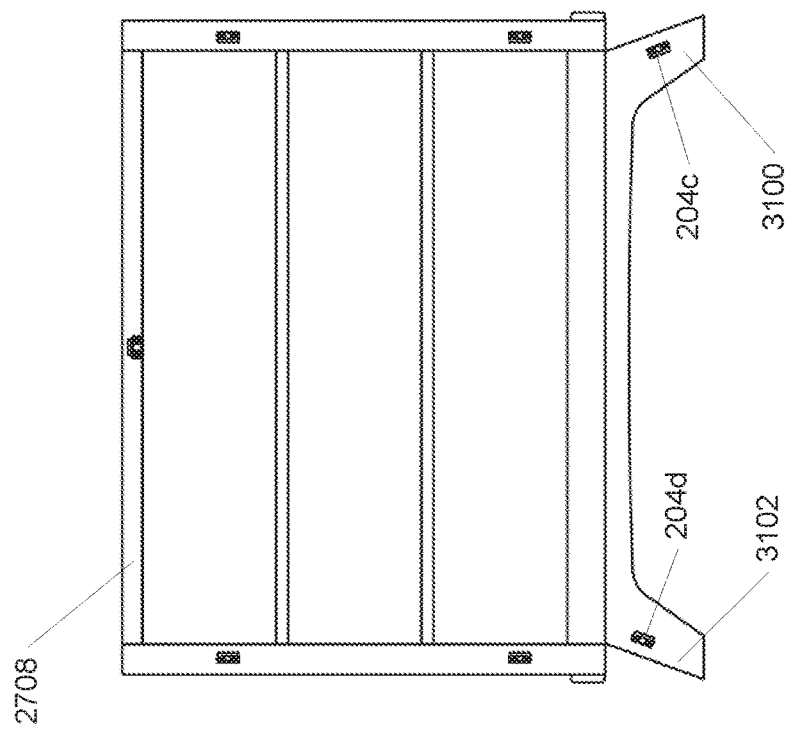
FIG. 31 is a side view of an example front wall of the example RTA furniture kit of FIG. 27 that may be used to build the example dresser.
Figure 30:
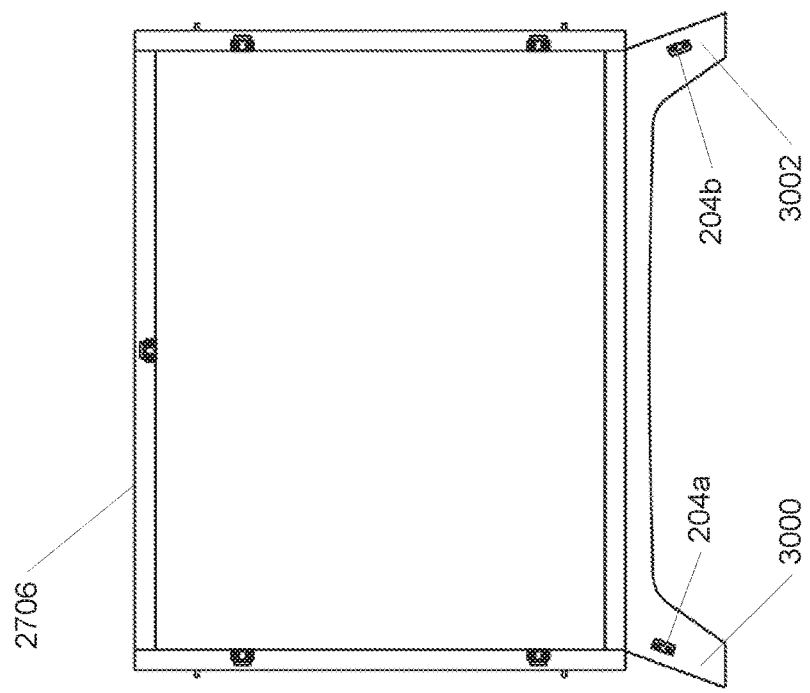
FIG. 30 is a side view of an example rear wall of the example RTA furniture kit of FIG. 27 that may be used to build the example dresser.

FIG. 27 illustrates another RTA furniture kit having a plurality of parts or components that may be assembled to build a dresser 2701 and which includes all of the components of FIGS. 27-33 and any components of FIGS. 1-26 (such as, for example, those of the connectors 200 of FIGS. 2A-E and the drawer of FIGS. 20-25) in an unassembled state or a partially unassembled state where one or more of the component(s) are coupled to one or more other component(s). Similar to the example kit of FIGS. 1-26, the second example kit of FIGS. 27-33 uses multiple connectors 200 to couple the walls or panels of the dresser 2701 and its drawers together. In the illustrated example, the dresser 2701 includes a left side wall 2702, a right side wall 2704, a rear wall 2706, a front wall 2708 and a top wall 2710. The left side, right side, rear, front and top walls 2702, 2704, 2706, 2708, 2710 may be substantially similar to the respective left side, right side, rear, front and top walls 102, 104, 106, 108, 110 of the example kit of FIGS. 1-26. FIG. 28 illustrates the example left side wall 2702, FIG. 29 illustrates the example right side wall 2704, FIG. 30 illustrates the example rear wall 2706 and FIG. 31 illustrates the example front wall 2708. In the illustrated examples, two connector blocks are provided near each of the sides of each of the walls 2702, 2704, 2706, 2708 to couple the walls to the other respective walls. The connector blocks are oriented and function in a similar manner to the walls 102, 104, 106, 108 of FIGS. 3-7.

As illustrated in FIG. 27, the example dresser 2701 includes a plurality of drawers. In the illustrated example, the dresser 2701 includes a first drawer 2712, a second drawer 2714 and a third drawer 2716. The first, second and third drawers 2712, 2714, 2716 maybe structurally and functionally similar to the first drawer 112 as disclosed in connection with the dresser 101.

In the illustrated example of FIG. 27, the dresser 2701 has a left side brace 2718 and a right side brace 2720. Turning to FIGS. 30 and 31, the rear wall 2706 includes a left leg 3000 and a right leg 3002, and the front wall 2708 includes a left leg 3100 and a right leg 3102, which support the dresser 2701 above a support surface (e.g., a floor). A first female block 204a is coupled to an inside surface 3004 of the rear wall 2706 on the left leg 3000 and a second female block 204b is coupled to the inside surface 3004 on the right leg 3002. The first and second female blocks 204a, 204b are coupled along their respective fourth sides (e.g., the fourth side 226, as illustrated in FIG. 2A) to the respective left and right legs 3000, 3002, and the openings (e.g., the opening 232, as illustrated in FIG. 2A) of the respective first and second female blocks 204a, 204b face outward from (e.g., are perpendicular to) the respective left and right legs 3000, 3002. The first and second female blocks 204a, 204b are used to couple the left leg 3000 and the right leg 3002 to the respective left and right side braces 2718, 2720 (FIG. 27) when assembling the dresser 2701 (FIG. 27). The first and second female blocks 204a, 204b may be coupled to the rear wall 2706 via screws or other fastening devices (e.g., through the example holes 238, 240, as illustrated in FIG. 2B).

As illustrated in FIG. 31, a third female block 204c is coupled to an inside surface 3104 of the front wall 2708 on the left leg 3100 and a fourth female block 204d is coupled to the inside surface 3104 on the right leg 3102. The third and fourth female blocks 204c, 204d are coupled along their respective fourth sides (e.g., the fourth side 226, as illustrated in FIG. 2A) to the respective left and right legs 3100, 3102, and the openings (e.g., the opening 232, as illustrated in FIG. 2A) of the respective third and fourth female blocks 204c, 204d face outward from (e.g., are perpendicular to) the respective left and right legs 3100, 3102. The third and fourth female blocks 204c, 204d are used to couple the left leg 3100 and the right leg 3102 to the respective left and right side braces 2718, 2720 (FIG. 27) when assembling the dresser 2701 (FIG. 27). The third and fourth female blocks 204c, 204d may be coupled to the front wall 2708 via screws or other fastening devices (e.g., through the example holes 238b, 240, as illustrated in FIG. 2B).

Figure 32:
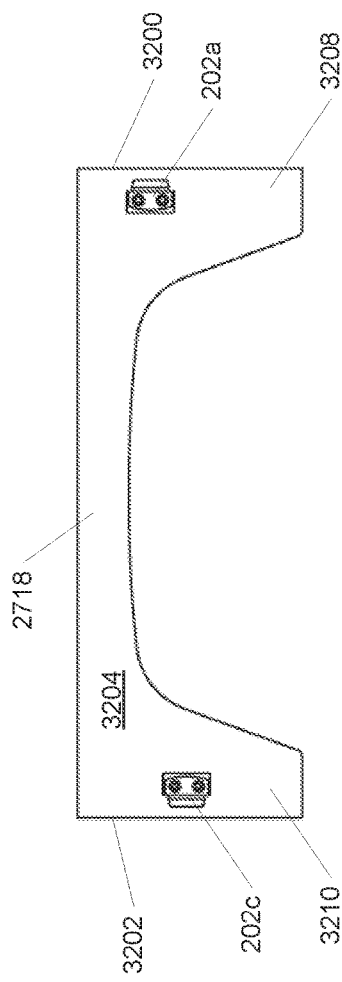
FIG. 32 is a side view of an example left side brace of the example RTA furniture kit of FIG. 27 that may be used to build the example dresser.
Figure 33:
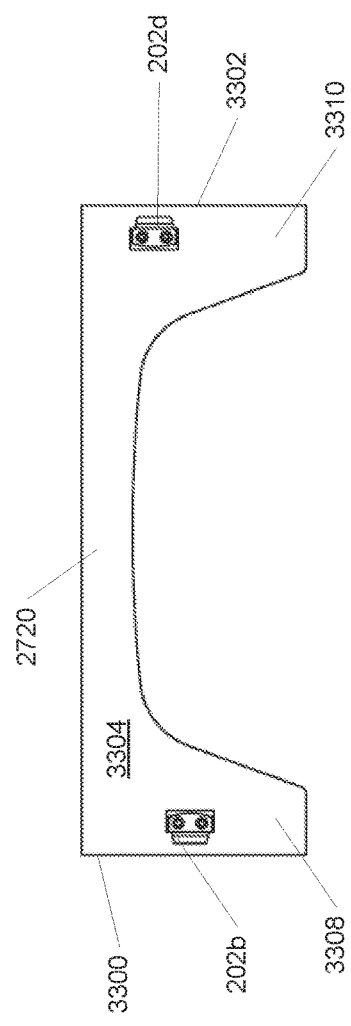
FIG. 33 is a side view of an example right side brace of the example RTA furniture kit of FIG. 27 that may be used to build the example dresser.

FIG. 32 illustrates a side view of the left side brace 2718 and FIG. 33 illustrates a side view of the right side brace 2720. The left side brace 2718 has a rear side edge 3200, a front side edge 3202 opposite the rear side edge 3200, an inside surface 3204, an outside surface 3206 (FIG. 27) opposite the inside surface 3204, a left rear leg 3208 and a left front leg 3210. A first male connector 202a is coupled to the inside surface 3204 of the left side brace 2718 on the left rear leg 3208 and a third male connector 202c is coupled to the inside surface 3204 on the left front leg 3210. The first and third male connectors 202a, 202c are coupled along their respective second sides (e.g., the second side 208, as illustrated in FIG. 2A) to the left side brace 2718. The first male block 202a is oriented with its extension (e.g., the extension 218, as illustrated in FIG. 2A) extending toward the rear side edge 3200, and the third male block 202c is oriented with its extension (e.g., extension 218, as illustrated in FIG. 2A) extending toward the front side edge 3202. The first and third male blocks 202a, 202c may be coupled to the left side brace 2718 via screws or other fastening devices (e.g., through the example holes 234, 236, as illustrated in FIG. 2A).

To assemble the example dresser 2701 (FIG. 27), the first male block 202a is to be coupled to the first female block 204a (FIG. 30) on the left leg 3000 (FIG. 30) of the rear wall 2706 (FIG. 30), and the third male block 202c is to be coupled to the third female bock 204c (FIG. 31) on the left leg 3100 (FIG. 31) of the front wall 2708 (FIG. 31). A first locking cover (e.g., similar to the locking cover 246 of FIG. 2A) is included in the example kit and is used to further couple the first male and female blocks 202a, 204a to join the left rear leg 3208 of the left side brace 2718 to the left leg 3000 (FIG. 30) of the rear wall 2706 (FIG. 30). Similarly, a third locking cover (e.g., similar to the locking cover 246 of FIG. 2A) is included in the example kit and is used to further couple the third male and female blocks 202c, 204c to join the left front leg 3210 of the left side brace 2718 to the left leg 3100 (FIG. 31) of the front wall 2708 (FIG. 31).

The right side brace 2720, as illustrated in FIG. 33, has a rear side edge 3300, a front side edge 3302 opposite the rear side edge 3300, an inside surface 3304, an outside surface opposite the inside surface 3304, a right rear leg 3308 and a right front leg 3310. A second male connector 202b is coupled to the inside surface 3304 of the right side brace 2720 on the right rear leg 3308 and a fourth male connector 202d is coupled to the inside surface 3304 on the right front leg 3210. The second and fourth male connectors 202b, 202d are coupled along their respective second sides (e.g., the second side 208, as illustrated in FIG. 2A) to the right side brace 2720. The second male block 202b is oriented with its extension (e.g., extension 218, as illustrated in FIG. 2A) extending toward the rear side edge 3300, and the fourth male block 202d is oriented with its extension (e.g., extension 218, as illustrated in FIG. 2A) extending toward the front side edge 3302. The second and fourth male blocks 202b, 202d may be coupled to the right side brace 2720 via screws or other fastening devices (e.g., through the example holes 234, 236, as illustrated in FIG. 2A).

To assemble the dresser 2701 (FIG. 27), the second male block 202b is to be coupled to the second female block 204b (FIG. 30) on the right leg 3002 (FIG. 30) of the rear wall 2706 (FIG. 30), and the fourth male block 202d is to be coupled to the fourth female bock 204d (FIG. 31) on the right leg 3102 (FIG. 31) of the front wall 2708 (FIG. 31). A second locking cover (e.g., similar to the locking cover 246 of FIG. 2A) is included in the example kit and is used to further couple the second male and female blocks 202b, 204b to join the right rear leg 3308 of the right side brace 2720 to the right leg 3002 (FIG. 30) of the rear wall 2706 (FIG. 30). Similarly, a fourth locking cover (e.g., similar to the locking cover 246 of FIG. 2A) is included in the example kit and is used to further couple the fourth male and female blocks 202d, 204d to join the right front leg 3310 of the right side brace 2720 to the right leg 3102 (FIG. 31) of the front wall 2708 (FIG. 31).

Figure 34A:
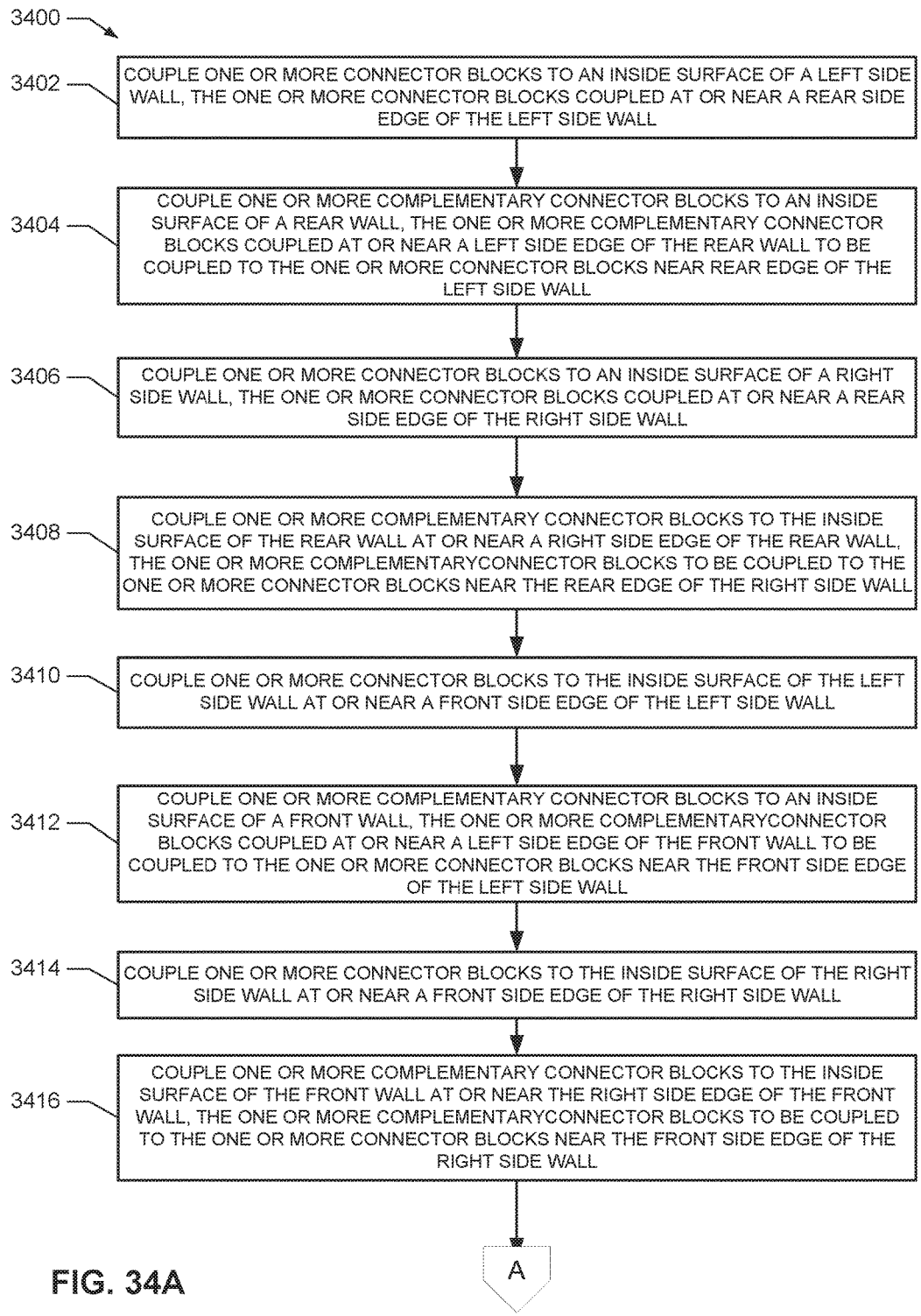
FIGS. 34A, 34B and 34C are a flowchart representative of an example method of making RTA furniture and that may be implemented to make the example RTA furniture kit of FIG. 1 and/or the example furniture RTA kit of FIG. 27 in accordance with the teachings of this disclosure.
Figure 34B:
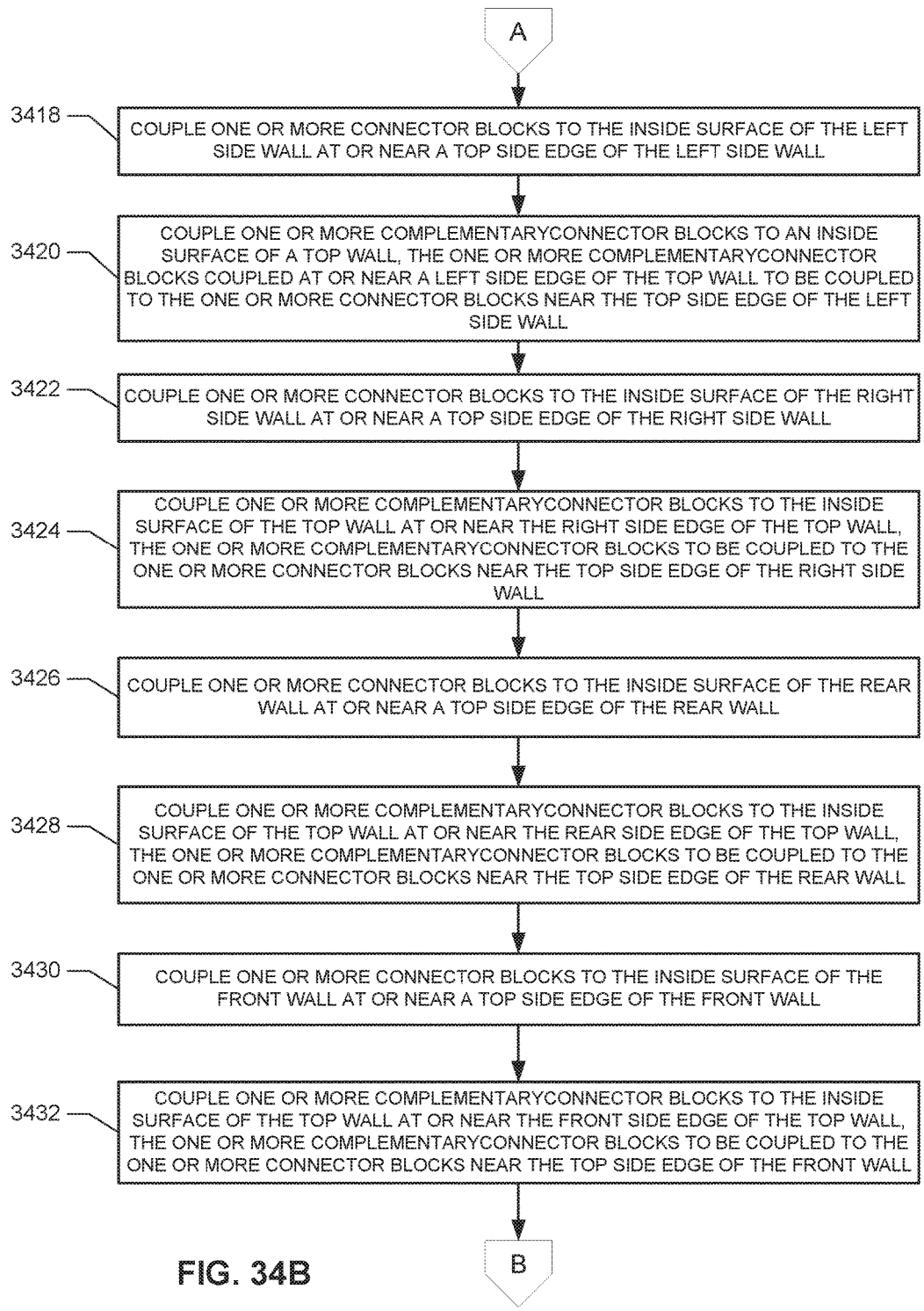
Figure 34C:
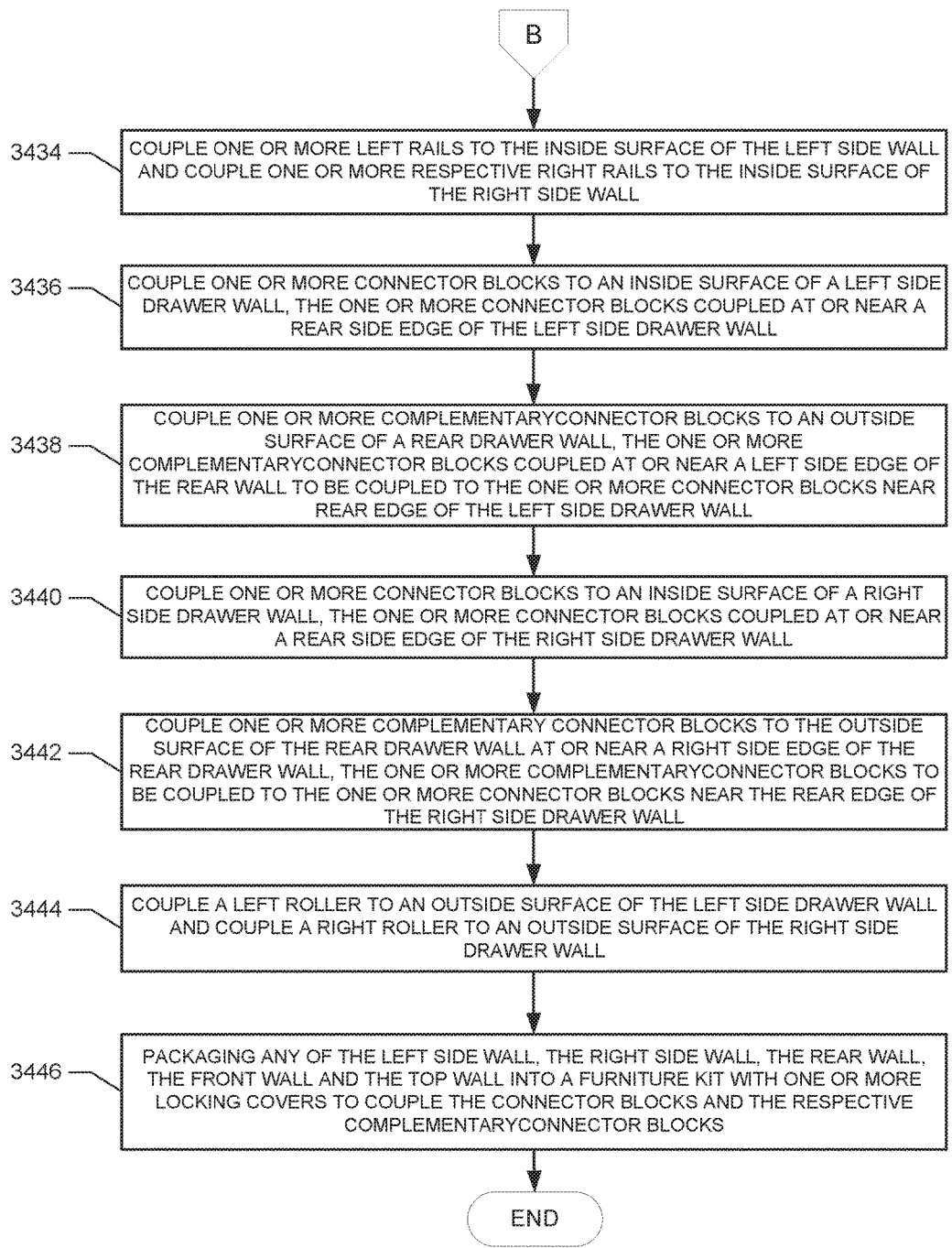

FIGS. 34A-34C are a flowchart representative of an example method 3400 that may be implemented to make an example RTA furniture kit such as, for example, the RTA furniture kit of FIGS. 1-26 and/or the RTA furniture kit of FIGS. 27-33. The example method 3400 may be performed by, for example, a manufacturer of the RTA furniture kits. While an example manner of implementing the example furniture kits is illustrated in FIGS. 1-33, one or more of the blocks and/or processes illustrated in FIGS. 34A-34C may be combined, divided, re-arranged, omitted, eliminated and/or implemented in any other way. Further still, the example method of FIGS. 34A-34C may include one or more processes and/or blocks in addition to, or instead of, those illustrated in FIGS. 34A-34C, and/or may include more than one of any or all of the illustrated processes and/or blocks. Further, although the example method 3400 is described with reference to the flow chart illustrated in FIGS. 34A-34C, many other methods of implementing RTA furniture kits may alternatively be used.

The example method 3400, illustrated in FIG. 34A, includes coupling one or more connector blocks to an inside surface of a left side wall (block 3402). The left side wall has a front side edge and a rear side edge opposite the front side edge. The one or more connector blocks are coupled at or near the rear side edge of the left side wall. For example, in FIG. 3, the first, second and third female blocks 204a, 204b, 204c are coupled to the inside surface 308 of the left side wall 102 at or near the rear side edge 302. The first, second and third female blocks 204a, 204b, 204c are coupled along their fourth sides to the left side wall 102 with their openings facing outward from (e.g., perpendicular to) the left side wall 102. The first, second and third female blocks 204a, 204b, 204c may be coupled to the left side wall 102 via screws or other fastening devices (e.g., through the example holes 238, 240, as illustrated in FIG. 2B).

The example method 3400 includes coupling one or more complementary connector blocks to an inside surface of a rear wall (block 3404). The rear wall has a left side edge and a right side edge opposite the left side edge. The one or more complementary connector blocks are coupled at or near the left side edge of the rear wall and are to be coupled to the respective one or more connector blocks near the rear side edge of the left side wall. For example, as illustrated in FIG. 5, the first, second and third male blocks 202a, 202b, 202c are coupled to the inside surface 508 of the rear wall 106 at or near the left side edge 500. The first, second and third male blocks 202a, 202b, 202c are coupled along their second sides with their extensions extending toward the left side edge 500. The first, second and third male blocks 202a, 202b, 202c may be coupled to the rear wall 106 via screws or other fastening devices (e.g., through the example holes 234, 236 as illustrated in FIG. 2A). During assembly, the first, second and third male blocks 202a, 202b, 202c are to be coupled to the first, second and third female blocks 204a, 204b, 204c on the left side wall 102 (e.g., via the first second and third locking covers 246a, 246b, 246c) to join the left side wall 102 to the rear wall 106, as illustrated in FIG. 14.

The example method 3400 includes coupling one or more connector blocks to an inside surface of a right side wall (block 3406). The right side wall has a front side edge and a rear side edge opposite the front side edge. The one or more connector blocks are coupled at or near the rear side edge of the right side wall. For example, in FIG. 4, the eighth, ninth and tenth female blocks 204h, 204i, 204j are coupled to the inside surface 408 of the right side wall 104 at or near the rear side edge 402. The eighth, ninth and tenth female blocks 204h, 204i, 204j are coupled along their fourth sides to the right side wall 104 with their openings facing outward from (e.g., perpendicular to) the right side wall 102. The eighth, ninth and tenth female blocks 204h, 204i, 204j may be coupled to the right side wall 104 via screws or other fastening devices (e.g., through the example holes 238, 240, as illustrated in FIG. 2B).

The example method 3400 includes coupling one or more complementary connector blocks to the inside surface of the rear wall (block 3408) at or near the right side edge of the rear wall. The one or more complementary connector blocks are to be coupled to the respective one or more connector blocks near the rear side edge of the right side wall. For example, as illustrated in FIG. 5, the eighth, ninth and tenth male blocks 202h, 202i, 202j are coupled to the inside surface 508 of the rear wall 106 at or near the right side edge 502. The eighth, ninth and tenth male blocks 202h, 202i, 202j are coupled along their second sides with their extensions facing toward the right side edge 502. The eighth, ninth and tenth male blocks 202h, 202i, 202j may be coupled to the rear wall 106 via screws or other fastening devices (e.g., through the example holes 234, 236, as illustrated in FIG. 2A). During assembly, the eighth, ninth and tenth male blocks 202h, 202i, 202j are to be coupled to the eighth, ninth and tenth female blocks 204h, 204i, 204j on the right side wall 104 (e.g., via the eighth, ninth and tenth locking covers 246h, 246i, 246j) to join the right side wall 104 to the rear wall 106, as illustrated in FIG. 16.

The example method includes 3400 includes coupling one or more connector blocks to the inside surface of the left side wall at or near the front side edge of the left side wall (block 3410). For example, in FIG. 3, the fourth, fifth and sixth male blocks 202d, 202e, 202f are coupled to the inside surface 308 of the left side wall 102 at or near the front side edge 300. The fourth, fifth and sixth male blocks 202d, 202e, 202f are coupled along their second sides to the left side wall 102 with their extensions extending toward the front side edge 300. The fourth, fifth and sixth male blocks 202d, 202e, 202f may be coupled to the left side wall 102 via screws or other fastening devices (e.g., through the example holes 234, 236, as illustrated in FIG. 2A).

The example method 3400 includes coupling one or more complementary connector blocks to an inside surface of a front wall (block 3412). The front wall has a left side edge and a right side edge. The one or more complementary connector blocks are coupled at or near the left side edge of the front wall and are to be coupled to the respective one or more connector blocks near the front side edge of the left side wall. For example, in FIG. 6, the fourth, fifth and sixth female blocks 202d, 202e, 202f are coupled to the inside surface 608 of the front wall 108 at or near the left side edge 600. The fourth, fifth and sixth female blocks 202d, 202e, 202f are coupled along their fourth sides to the front wall 108 with their openings facing outward from (e.g., perpendicular to) the front wall 108. The fourth, fifth and sixth female blocks 202d, 202e, 202f may be coupled to the front wall 108 via screws or other fastening devices (e.g., through the example holes 238, 240, as illustrated in FIG. 2B). During assembly, the fourth, fifth and sixth female blocks 202d, 202e, 202f are to be coupled to the fourth, fifth and sixth male blocks 202*d*, 202*e*, 202*f* on the left side wall 102 (e.g., via fourth, fifth and sixth locking covers) to join the left side wall 102 to the front wall 108, as illustrated in FIG. 18.

The example method 3400 includes coupling one or more connector blocks to the inside surface of the right side wall at or near the front side edge of the right side wall (block 3414). For example, in FIG. 4, the eleventh, twelfth and thirteenth male blocks 202*k*, 202*l*, 202*m* are coupled to the inside surface 408 of the right side wall 104 at or near the front side edge 400. The eleventh, twelfth and thirteenth male blocks 202*k*, 202*l*, 202*m* are coupled along their second sides to the right side wall 104 with their extensions extending toward the front side edge 400. The eleventh, twelfth and thirteenth male blocks 202*k*, 202*l*, 202*m* may be coupled to the right side wall 104 via screws or other fastening devices (e.g., through the example holes 234, 236, as illustrated in FIG. 2A).

The example method 3400 includes coupling one or more complementary connector blocks to the inside surface of the front wall at or near the right side edge of the front wall (block 3416). The one or more complementary connector blocks are to be coupled to the respective one or more connector blocks near the front side edge of the right side wall. For example, in FIG. 6, the eleventh, twelfth and thirteenth female blocks 202*k*, 202*l*, 202*m* are coupled to the inside surface 608 of the front wall 108 at or near the right side edge 602. The eleventh, twelfth and thirteenth female blocks 202*k*, 202*l*, 202*m* are coupled along their fourth sides to the front wall 108 with their openings facing outward from (e.g., perpendicular to) the front wall 108. The eleventh, twelfth and thirteenth female blocks 202*k*, 202*l*, 202*m* may be coupled to the front wall 108 via screws or other fastening devices (e.g., through the example holes 238, 240, as illustrated in FIG. 2B). During assembly, the eleventh, twelfth and thirteenth female blocks 202*k*, 202*l*, 202*m* are to be coupled to the eleventh, twelfth and thirteenth male blocks 202*k*, 202*l*, 202*m* on the right side wall 104 (e.g., via eleventh, twelfth and thirteenth locking covers) to join the right side wall 104 to the front wall 108, as illustrated in FIG. 18.

The example method 3400, continuing into FIG. 34B, includes coupling one or more connector blocks to the inside surface of the left side wall at or near a top side edge of the left side wall (block 3418). For example, in FIG. 3, the seventh male block 202*g* is coupled to the inside surface 308 of the left side wall 102 at or near the top side edge 304. The seventh male block 202*g* is coupled along its second side to the left side wall 102 with its extension extending toward the top side edge 304. The seventh male block 202*g* may be coupled to the left side wall 102 via screws or other fastening devices (e.g., through the example holes 234, 236, as illustrated in FIG. 2A).

The example method 3400 includes coupling one or more complementary connector blocks to an inside surface of a top wall (block 3420). The top wall has a left side edge, a right side edge opposite the left side edge, a front side edge and a rear side edge opposite the front side edge. The one or more complementary connector blocks are coupled at or near the left side edge of the top wall and are to be coupled to the respective one or more connector blocks near the top side edge of the left side wall. For example, in FIG. 7, the seventh female block 204*g* is coupled to the inside surface 708 of the top wall 110 at or near the left side edge 700. The seventh female block 204*g* is coupled along its fourth side to the top wall 110 with its opening facing outward from (e.g., perpendicular to) the top wall 110. The seventh female block 204*g* may be coupled to the top wall 110 via screws or other fastening devices (e.g., through the example holes 238, 240, as illustrated in FIG. 2B). During assembly, the seventh female block 204*g* is to be coupled to the seventh male block 202*g* on the left side wall 102 (e.g., via a seventh locking cover) to join the left side wall 102 to the top wall 110.

The example method 3400 includes coupling one or more connector blocks to the inside surface of the right side wall at or near a top side edge of the right side wall (block 3422). For example, in FIG. 4, the fourteenth male block 202*n* is coupled to the inside surface 408 of the right side wall 104 at or near the top side edge 404. The fourteenth male block 202*n* is coupled along its second side to the right side wall 104 with its extension extending toward the top side edge 404. The fourteenth male block 202*n* may be coupled to the right side wall 104 via screws or other fastening devices (e.g., through the example holes 234, 236, as illustrated in FIG. 2A).

The example method 3400 includes coupling one or more complementary connector blocks to the inside surface of the top wall at or near the right side edge of the top wall (block 3424). The one or more complementary connector blocks are to be coupled to the respective one or more connector blocks near the top side edge of the right side wall. For example, in FIG. 7, the fourteenth female block 204*n* is coupled to the inside surface 708 of the top wall 110 at or near the right side edge 702. The fourteenth female block 204*n* is coupled along its fourth side to the top wall 110 with its opening facing outward from (e.g., perpendicular to) the top wall 110. The fourteenth female block 204*n* may be coupled to the top wall 110 via screws or other fastening devices (e.g., through the example holes 238, 240, as illustrated in FIG. 2B). During assembly, the fourteenth female block 204*n* is to be coupled to the fourteenth male block 202*n* on the right side wall 104 (e.g., via a fourteenth locking cover) to join the right side wall 104 to the top wall 110.

The example method 3400 includes coupling one or more connector blocks to the inside surface of the rear wall at or near a top side edge of the rear wall (block 3426). For example, in FIG. 5, the fifteenth male block 202*o* is coupled to the inside surface 508 of the rear wall 106 at or near the top side edge 504. The fifteenth male block 202*o* is coupled along its second side to the rear wall 106 with its extension extending toward the top side edge 504. The fifteenth male block 202*o* may be coupled to the rear wall 106 via screws or other fastening devices (e.g., through the example holes 234, 236, as illustrated in FIG. 2A).

The example method 3400 includes coupling one or more complementary connector blocks to the inside surface of the top wall at or near the rear side edge of the top wall (block 3428). The one or more complementary connector blocks are to be coupled to the respective one or more connector blocks near the top side edge of the rear wall. For example, in FIG. 7, the fifteenth female block 204*o* is coupled to the inside surface 708 of the top wall 110 at or near the rear side edge 706. The fifteenth female block 204*o* is coupled along its fourth side to the top wall 110 with its opening facing outward from (e.g., perpendicular to) the top wall 110. The fifteenth female block 204*o* may be coupled to the top wall 110 via screws or other fastening devices (e.g., through the example holes 238, 240, as illustrated in FIG. 2B). During assembly, the fifteenth female block 204*o* is to be coupled to the fifteenth male block 202*o* on the rear wall 106 (e.g., via a fifteenth locking cover) to join the rear wall 106 to the top wall 110.

The example method 3400 includes coupling one or more connector blocks to the inside surface of the front wall at or near a top side edge of the front wall (block 3430). For example, in FIG. 6, the sixteenth male block 202p is coupled to the inside surface 608 of the front wall 108 at or near the top side edge 604. The sixteenth male block 202p is coupled along its second side to the front wall 108 with its extension extending toward the top side edge 604. The sixteenth male block 202p may be coupled to the front wall 108 via screws or other fastening devices (e.g., through the example holes 234, 236, as illustrated in FIG. 2A).

The example method 3400 includes coupling one or more complementary connector blocks to the inside surface of the top wall at or near the front side edge of the top wall (block 3432). The one or more complementary connector blocks are to be coupled to the respective one or more connector blocks near the top side edge of the front wall. For example, in FIG. 7, the sixteenth female block 204p is coupled to the inside surface 708 of the top wall 110 at or near the front side edge 704. The sixteenth female block 204p is coupled along its fourth side to the top wall 110 with its opening facing outward from (e.g., perpendicular to) the top wall 110. The sixteenth female block 204p may be coupled to the top wall 110 via screws or other fastening devices (e.g., through the example holes 238, 240, as illustrated in FIG. 2B). During assembly, the sixteenth female block 204p is to be coupled to the sixteenth male block 202p on the front wall 108 (e.g., via a sixteenth locking cover) to join the front wall 108 to the top wall 110.

In some examples, a kit may include one or more walls or panels that may be assembled into one or more drawers for the piece of furniture (e.g., a dresser). The example method 3400, continuing in FIG. 34C, includes coupling one or more left rails to the left side wall and one or more respective right rails to the right side wall (block 3434). The rails enable the one or more drawers to slide. For example, in FIGS. 3 and 4, the left side wall 102 includes the first, second, third and fourth left rails 316, 318, 320, 322 and the right side wall 104 includes the first, second, third and fourth right rails 416, 418, 420, 422. The rails 316, 318, 320, 322, 416, 418, 420, 422 enable the respective drawers 112, 114, 116, 118 to slide into and out of the dresser 101. The one or more rails may be coupled to the respective left and right side walls via screws or other fastening devices.

The example method 3400 includes coupling one or more connector blocks to an inside surface of a left side drawer wall (block 3436). The left side drawer wall has a front side edge and a rear side edge opposite the front side edge. The one or more connector blocks are coupled to the inside surface of the left side drawer wall at or near the rear side edge. For example, in FIGS. 8A and 8B, the seventeenth female block 204q is coupled to the inside surface 810 of the left side drawer wall 800 at or near the rear side edge 804. The seventeenth female block 204q is coupled along its fourth side to the left side drawer wall 800 with its opening facing outward from (e.g., perpendicular to) the left side drawer wall 800. The seventeenth female block 204q may be coupled to the left side drawer wall 800 via screws or other fastening devices (e.g., through the example holes 238, 240, as illustrated in FIG. 2B).

Figure 24:
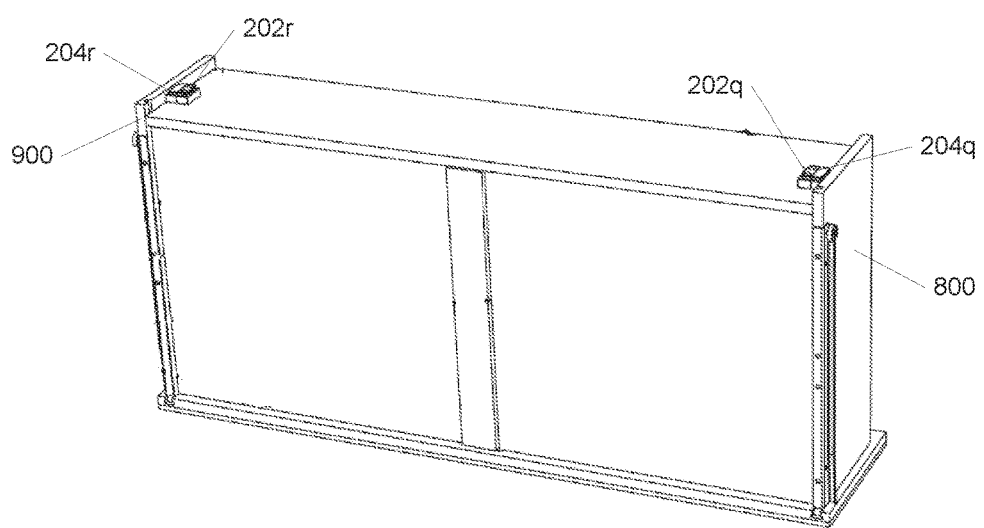
FIG. 24 is a bottom perspective view of the example rear drawer wall of FIG. 23 being coupled to the example left side drawer, right side drawer and bottom drawer walls of FIG. 23.

The example method includes coupling one or more complementary connector blocks to an outside surface of a rear drawer wall (block 3438). The rear drawer wall has a left side edge, a right side edge opposite the left side edge, an inside surface and an outside surface opposite the inside surface. The one or more complementary connector blocks are coupled at or near the left side edge of the rear drawer wall and are to be coupled to the respective one or more connector blocks near the rear side edge of the left side drawer wall. For example, as illustrated in FIGS. 10A and 10B, the seventeenth male block 202q is coupled to the outside surface 1012 of the rear drawer wall 1000 at or near the left side edge 1002. The seventeenth male block 202q is coupled along is second side with its extensions extending toward the left side edge 1002. The seventeenth male block 202q may be coupled to the rear drawer wall 1000 via screws or other fastening devices (e.g., through the example holes 234, 236, as illustrated in FIG. 2A). During assembly, the seventeenth male block 202q is to be coupled to the seventeenth female block 204q on the left side drawer wall 800 (e.g., via a seventeenth locking cover) to join the left side drawer wall 800 to the rear drawer wall 1000, as illustrated in FIG. 24.

The example method 3400 includes coupling one or more connector blocks to an inside surface of a right side drawer wall (block 3440). The right side drawer wall has a front side edge and a rear side edge opposite the front side edge. The one or more connector blocks are coupled to the inside surface of the right side drawer wall at or near the rear side edge. For example, in FIGS. 9A and 9B, the eighteenth female block 204r is coupled to the inside surface 910 of the right side drawer wall 900 at or near the rear side edge 904. The eighteenth female block 204r is coupled along its fourth side to the right side drawer wall 900 with its opening facing outward from (e.g., perpendicular to) the right side drawer wall 900. The eighteenth female block 204r may be coupled to the right side drawer wall 900 via screws or other fastening devices (e.g., through the example holes 238, 240, as illustrated in FIG. 2B).

The example method includes coupling one or more complementary connector blocks to the outside surface of the rear drawer wall at or near the right side edge of the rear drawer wall (block 3442). The one or more complementary connector blocks are to be coupled to the respective one or more connector blocks near the rear side edge of the right side drawer wall. For example, as illustrated in FIGS. 10A and 10B, the eighteenth male block 202r is coupled to the outside surface 1012 of the rear drawer wall 1000 at or near the right side edge 1004. The eighteenth male block 202r is coupled along is second side with its extensions extending toward the right side edge 1004. The eighteenth male block 202r may be coupled to the rear drawer wall 1000 via screws or other fastening devices (e.g., through the example holes 234, 236, as illustrated in FIG. 2A). During assembly, the eighteenth male block 202r is to be coupled to the eighteenth female block 204r on the right side drawer wall 900 (e.g., via an eighteenth locking cover) to join the right side drawer wall 900 to the rear drawer wall 1000.

The example method 3400 includes coupling a left roller to an outside surface of the left side drawer wall and coupling a right roller to an outside surface of the right side drawer wall (block 3444). The left and right rollers enable the drawer, when assembled, to slide within the left and right rails of the piece of furniture (e.g., a dresser). For example, in FIG. 8A, the left roller 816 is coupled to the outside surface 812 of the left side drawer wall 800. In FIG. 9A, the right roller 916 is coupled to the outside surface 912 of the right side drawer wall 900. When the drawer first 112 is assembled, the left roller 816 can be received in the first left rail 316 and the right roller 916 can be received in the firth right rail 416 to enable the first drawer 112 to slide or roll within the rails 316, 416. The left roller and the right roller may be coupled to the respective left and right side drawer walls via screws or other fastening devices.

The methods of blocks 3436-3444 may be repeated multiple times depending on the number of drawers to be included in an example furniture kit, for example. In some examples, the kit includes left and/or right side braces (e.g., the left and right side braces 2718, 2720 in FIG. 27). In some examples, the left and/or right side braces are coupled to legs of the rear and front walls with connector blocks and complementary connector blocks (e.g., as illustrated in FIGS. 30-33). In such an example, the example method 3400 may also include coupling one or more connector blocks the left and/or right side braces and coupling one or more complementary connector blocks to left and/or right legs of the rear and/or front walls.

The example method 3400 includes packaging the left side wall, the right side wall, the rear wall, the front wall and the top wall into an RTA furniture kit with one or more locking covers to couple the connector blocks and the respective complementary connector blocks (block 3446). In some examples, the RTA furniture kit one or more of the left side drawer wall, the right side drawer wall and the rear drawer wall, which may be assembled to build one or more drawers. One or more locking covers may also be included to couple the connector blocks and the respective complementary connector blocks.

From the foregoing, it will be appreciated that RTA furniture kits have been disclosed. Some such kits include walls having connector blocks that couple together and enable relatively easy assembly of a piece of furniture, such as a dresser. The male and female connector blocks are coupled to the walls or panels that are to be assembled to build the dresser. When the two walls are to be joined (e.g., during assembly), the male and female connector blocks are engaged, and a clip or locking cover is inserted into the engaged male and female connector blocks to further couple and the connector blocks and, thus, couple the walls. The example RTA furniture kits may be assembled in a relatively short amount of time to result in a fully built and functional piece of furniture (e.g., a dresser including one or more drawers).

Although certain example apparatus and methods, and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   coupling a first block of a first connector to a rear wall of a disassembled piece of furniture, the rear wall having a first side edge and a second side edge opposite the first side edge, the first block to be coupled at or near the first side edge, the first block having a first groove;
   coupling a second block of the first connector to a first side wall of the piece of furniture, the first side wall having a front side edge and a rear side edge, the second block to be coupled at or near the rear side edge, the second block having a second groove, the first side edge of the rear wall to be engaged with the first side wall at or near the rear side edge of the first side wall when the piece of furniture is assembled, wherein one of the first block or the second block includes a first extension and the other of the first block or the second block includes a first opening to receive the first extension when the first and second blocks are coupled, and, when the first and second blocks are coupled, the first groove and the second groove are disposed on opposite sides of the first connector; and
   packaging the rear wall, the first side wall and a first locking cover into a furniture kit to be used to assemble the piece of furniture, the first locking cover including a first plate with a first tongue along a first edge of the first plate and a second tongue along a second edge of the first plate opposite the first edge of the first plate, wherein, to couple the first and second blocks, the first locking cover is to be slid over the first connector to insert the first tongue into the first groove and insert the second tongue into the second groove.

2. The method of claim 1, wherein, when the first and second blocks are coupled and the rear wall and the first side wall are assembled, the first and second grooves are oriented vertically.

3. The method of claim 2, wherein the first locking cover is to be slid in a vertical direction to insert the first and second tongues into the respective first and second grooves.

4. The method of claim 2, wherein, when the first locking cover is coupled to the first and second blocks, the first plate is orientated parallel to the rear wall.

5. The method of 1 further including:
   coupling a third block of a second connector to the first side wall at or near the front side edge of the first side wall, the third block having a third groove; and
   coupling a fourth block of the second connector to a front trim plate of the piece of furniture, the front trim plate having a first side edge and a second side edge opposite the first side edge, the fourth block to be coupled at or near the first side edge of the front trim plate, the fourth block having a fourth groove, the first side edge of the front trim plate to be engaged with the front side edge of the first side wall when the piece of furniture is assembled, wherein one of the third block or the fourth block includes a second extension and the other of the third block or the fourth block includes a second opening to receive the second extension when the piece of furniture is assembled, and, when the third and fourth blocks are coupled to form the second connector, the third groove and the fourth groove are disposed on opposite sides of the second connector.

6. The method of claim 5, wherein packaging the furniture kit further includes packaging the front trim plate and a second locking cover, the second locking cover including a second plate with a third tongue along a third edge of the second plate and a fourth tongue along a fourth edge of the second plate opposite the third edge of the second plate, and wherein, to couple the third and fourth blocks, the second locking cover is to be slid over the second connector to insert the third tongue into the third groove and insert the fourth tongue into the fourth groove.

7. The method of claim 6, wherein, when the first and second blocks are coupled and the rear wall and the first side wall are assembled, the first and second grooves are oriented vertically, and, when the third and fourth blocks are coupled and the first side wall and the front trim plate are assembled, the third and fourth grooves are oriented vertically.

8. The method of claim 7, wherein, when the first locking cover is coupled to the first connector and the second locking cover is coupled to the second connector, the first and second locking covers are oriented perpendicular to each other.

9. The method of claim 8, wherein, when the first locking cover is coupled to the first connector and the second locking cover is coupled to the second connector, the first locking cover is parallel to the rear wall and the front trim plate and the second locking cover is parallel to the side wall.

10. The method of claim 1 further including:
coupling a third block of a second connector to a rear drawer wall of an unassembled drawer, the rear drawer wall having a first side edge and a second side edge opposite the first side edge, the third block to be coupled at or near the first side edge of the rear drawer wall, the third block having a third groove; and
coupling a fourth block of the second connector to a first side drawer wall of the drawer, the first side drawer wall having a rear side edge and a front side edge, the fourth block to be coupled at or near the rear side edge of the first side drawer wall, the fourth block having a fourth groove, the rear side edge of the first side drawer wall to be engaged with the first side edge of the rear drawer wall when the drawer is assembled, wherein one of the third block or the fourth block includes a second extension and the other of the third block or the fourth block includes a second opening to receive the second extension when the drawer is assembled, and, when the third and fourth blocks are coupled to form the second connector, the third groove and the fourth groove are disposed on opposite sides of the second connector.

11. The method of claim 10, wherein the third block includes the second extension and the fourth block includes the second opening.

12. The method of claim 11, wherein the second extension extends from the third block in a direction that is parallel to the rear drawer wall.

13. The method of claim 10, wherein the third block is to be coupled to an outer surface of the rear drawer wall, such that when the first drawer is assembled, the second connector is disposed outside of a cavity provided by the first drawer.

14. The method of claim 10, wherein packaging the furniture kit further includes packaging the rear drawer wall, the first side drawer wall and a second locking cover, the second locking cover including a second plate with a third tongue along a third edge of the second plate and a fourth tongue along a fourth edge of the second plate opposite the third edge of the second plate, and wherein, to couple the third and fourth blocks, the second locking cover is to be slid over the second connector to insert the third tongue into the third groove and insert the fourth tongue into the fourth groove.

15. The method of claim 14, wherein, when the second locking cover is coupled to the second connector, the second plate is parallel to the rear drawer wall.

16. The method of claim 14, wherein, when the piece of furniture is assembled and the first and second blocks are coupled with the first locking cover and when the drawer is assembled and the third and fourth blocks are coupled with the second lock cover, the first plate and the second plate are parallel to each other.

17. The method of claim 10 further including:
coupling a rail to an inside surface of the first side wall; and
coupling a roller to an outside surface of the first side drawer wall, the rail to receive the roller when the piece of furniture is assembled and the drawer is assembled.

18. The method of claim 17, wherein, when the piece of furniture is assembled and the drawer is assembled, the roller of the drawer is to be moveable along a first axis of the rail.

19. The method of claim 18, wherein the first locking cover is to slide along a second axis to couple the first and second blocks, the second axis orthogonal to the first axis.

20. The method of claim 1, wherein packaging the furniture kit further includes packaging a second side wall of the piece of furniture, the second side wall having a front side edge and a rear side edge, the second side edge of the rear wall to be engaged with the second side wall at or near the rear side edge of the second side wall when the piece of furniture is assembled.

21. The method of claim 1, wherein the piece of furniture is a dresser.

\* \* \* \* \*